United States Patent
Hamamoto et al.

(10) Patent No.: US 11,635,141 B2
(45) Date of Patent: Apr. 25, 2023

(54) WORKING MACHINE

(71) Applicant: KUBOTA CORPORATION, Osaka (JP)

(72) Inventors: Ryota Hamamoto, Osaka (JP); Kazuki Ueda, Osaka (JP); Daiki Abe, Osaka (JP); Kohei Nagao, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 15 days.

(21) Appl. No.: 17/394,612

(22) Filed: Aug. 5, 2021

(65) Prior Publication Data
US 2022/0049723 A1    Feb. 17, 2022

(30) Foreign Application Priority Data

Aug. 15, 2020  (JP) .............................. JP2020-137192
Aug. 15, 2020  (JP) .............................. JP2020-137193

(51) Int. Cl.
  *F16H 61/47*    (2010.01)
  *F16H 61/421*   (2010.01)
  *E02F 9/22*     (2006.01)
  *F16H 61/66*    (2006.01)

(52) U.S. Cl.
  CPC ......... *F16H 61/421* (2013.01); *E02F 9/2246* (2013.01); *E02F 9/2253* (2013.01); *F16H 61/47* (2013.01); *F16H 2061/6615* (2013.01)

(58) Field of Classification Search
  CPC .. E02F 9/2246; F16H 61/4183; F16H 61/461; F16H 61/46; F16H 61/47
  See application file for complete search history.

(56) References Cited

U.S. PATENT DOCUMENTS

| | | | | |
|---|---|---|---|---|
| 10,648,156 | B2 * | 5/2020 | Fukuda | F15B 11/163 |
| 10,920,881 | B2 * | 2/2021 | Fukuda | E02F 9/226 |
| 11,236,491 | B2 * | 2/2022 | Fukuda | E02F 9/2289 |

FOREIGN PATENT DOCUMENTS

JP       2017179922 A     10/2017

* cited by examiner

*Primary Examiner* — Thomas E Lazo
(74) *Attorney, Agent, or Firm* — Greenblum & Bernstein P.L.C.

(57) ABSTRACT

In a working machine, a traveling pump is driven by a prime mover to rotate a traveling motor by fluid therefrom. The traveling motor has a rotation speed shiftable between a lower first speed and a higher second speed. A traveling change-over valve is shiftable between a first state where the rotation speed of the traveling motor is set to the first speed and a second state where the rotation speed of the traveling motor is set to the second speed. A controller performs a shock-mitigation for reducing a rotation speed of the prime mover when the traveling change-over valve is shifted from the second state to the first state. The controller determines a reduction amount of rotation speed of the prime mover reduced by the shock mitigation based on a difference between a target rotation speed of the prime mover and an actual rotation speed of the prime mover.

11 Claims, 10 Drawing Sheets

WORKING MACHINE

BACKGROUND OF THE INVENTION

1. Field of the Invention

The present invention relates to a working machine such as a skid steer loader, a compact track loader, or a backhoe.

2. Description of the Related Art

A technique for reducing and increasing a speed of a working machine is disclosed in Japanese Unexamined Patent Publication No. 2017-179922. A hydraulic system for a working machine disclosed in Japanese Unexamined Patent Publication No. 2017-179922 includes a hydraulic pump configured to deliver hydraulic fluid, a hydraulic change-over valve configured to be switched to any one of a plurality of switching positions according to a pressure of the hydraulic fluid, and a traveling hydraulic system configured to change a speed according to the switching position of the hydraulic change-over valve.

SUMMARY OF THE INVENTION

In the working machine disclosed in Japanese Unexamined Patent Publication No. 2017-179922, a bleed fluid line is provided to a pressure-receiving portion of the hydraulic change-over valve, which makes it possible to reduce a shift shock in accelerating or decelerating the working machine. However, in the Japanese Unexamined Patent Publication No. 2017-179922, a bleed fluid line has to be provided to reduce the shift shock, which increases the number of parts.

In view of the problems of the conventional technique described above, the present invention intends to provide a working machine capable of easily reducing a shift shock.

In an aspect, a working machine includes a prime mover, a traveling pump driven by power of the prime mover so as to deliver operation fluid, a traveling motor configured to be rotated by the operation fluid delivered from the traveling pump, the traveling motor having a rotation speed shiftable between a first speed and a second speed that is higher than the first speed, a machine body provided thereon with the prime mover, the traveling pump and the traveling motor, a traveling change-over valve shiftable between a first state where the rotation speed of the traveling motor is set to the first speed and a second state where the rotation speed of the traveling motor is set to the second speed, and a controller configured or programmed to perform a shock-mitigation control for reducing a rotation speed of the prime mover when the traveling change-over valve is shifted from the second state to the first state. The controller is configured or programmed to determine a reduction amount of rotation speed of the prime mover reduced by the shock mitigation control based on a drop amount defined as a difference between a target rotation speed of the prime mover and an actual rotation speed of the prime mover.

The controller is configured or programmed to calculate a mitigation value of the prime mover in the shock mitigation control by subtracting the reduction amount from the actual rotation speed of the prime mover.

When a period for the shock mitigation control until the actual rotation speed of the prime mover reduced by the shock mitigation control reaches the mitigation value is defined as a mitigation period, the controller is configured or programmed to reduce the actual rotation speed of the prime mover at a first reduction rate kept constant for the mitigation period from a start point thereof to an end point thereof.

When a period for the shock mitigation control until the actual rotation speed of the prime mover reduced by the shock mitigation control reaches the mitigation value is defined as a mitigation period, the controller is configured or programmed to reduce the actual rotation speed of the prime mover at a second reduction rate for a first part of the mitigation period from a start point thereof to an intermediate point thereof, and to reduce the actual rotation speed of the prime mover at a third reduction rate less than the second reduction rate for a second part of the mitigation period from the intermediate point thereof to an end point thereof.

The controller is configured or programmed to change a timing for shifting the traveling change-over valve from the second state to the first state in correspondence to the drop amount.

The working machine includes a change-over switch operable to issue a speed-shift instruction selected between an acceleration instruction to shift the rotation speed of the traveling motor from the first speed to the second speed and a deceleration instruction to shift the rotation speed of the traveling motor from the second speed to the first speed, and an accelerator operable to set a target rotation speed of the prime mover. When the change-over switch is operated to issue the speed-shift instruction, the controller is configured or programed to reduce the actual rotation speed of the prime mover to the mitigation value determined based on the reduction amount, and to shift the traveling change-over valve to either the first state or the second state in correspondence to the speed-shift instruction.

The controller is configured or programmed to determine the reduction amount based on the drop amount in such a way that the reduction amount becomes larger as the drop amount becomes smaller, and the reduction amount becomes smaller as the drop amount becomes larger.

The working machine further includes a first traveling device provided on a left portion of the machine body, and a second traveling device provided on a right portion of the machine body. A first traveling motor configured to output a traveling power to the first traveling device and a second traveling motor configured to output a traveling power to the second traveling device are each provided as the traveling motor. The traveling pump is configured to rotate the first traveling motor and the second traveling motor. The traveling change-over valve is configured to shift the rotation speed of the first and second traveling motors between the first speed and the second speed.

In another aspect, a working machine includes a prime mover, a traveling pump driven by power of the prime mover so as to deliver operation fluid, a traveling motor configured to be rotated by the operation fluid delivered from the traveling pump, the traveling motor having a rotation speed shiftable between a first speed and a second speed that is higher than the first speed, a machine body provided thereon with the prime mover, the traveling pump and the traveling motor, a traveling change-over valve shiftable between a first state where the rotation speed of the traveling motor is set to the first speed and a second state where the rotation speed of the traveling motor is set to the second speed, a change-over switch operable to issue a speed-shift instruction selected between an acceleration instruction to shift the rotation speed of the traveling motor from the first speed to the second speed and a deceleration instruction to shift the rotation speed of the traveling motor from the second speed to the first speed, a traveling operation device including an operation valve configured to change a pressure of operation fluid to be applied to the traveling pump according to operation of an operation member, an actuation valve provided upstream or downstream of the operation valve to be fluidly connected to the operation valve so that the actuation valve is operable to control a flow of operation fluid to the operation valve, and a controller configured or programmed to perform a shock-mitigation control for reducing an opening degree of the actuation valve by outputting a control signal to the actuation valve when the traveling change-over valve is shifted from the first state to the second state. The controller is configured or programmed to determine a reduction amount of the opening degree of the actuation valve reduced by the shock-mitigation control, based on a straight-traveling degree of the machine body.

The actuation valve is configured so that the opening degree thereof becomes larger as a control value corresponding to the control signal becomes larger, and the opening degree thereof becomes smaller as the control value becomes smaller. The controller is configured or programed to determine a reduction amount of the control value as the reduction amount of the opening degree of the actuation valve based on the straight-traveling degree of the machine body, and to calculate a mitigation value for the shock-mitigation control based on the reduction amount.

When a period for the shock mitigation control until the control value reduced by the shock mitigation control reaches the mitigation value is defined as a mitigation period, the controller is configured or programmed to reduce the control value at a first reduction rate kept constant for the mitigation period from a start point thereof to an end point thereof.

When a period for the shock mitigation control until the control value reduced by the shock mitigation control reaches the mitigation value is defined as a mitigation period, the controller is configured or programmed to reduce the control value at a second reduction rate for a first part of the mitigation period from a start point thereof to an intermediate point thereof, and to reduce the control value at a third reduction rate for a second part of the mitigation period from the intermediate point thereof to an end point thereof, the second reduction rate being greater than the third reduction rate.

The controller is configured or programmed to change a timing for shifting the traveling change-over valve from the first state to the second state in correspondence to modified example in the straight-traveling degree.

The controller is configured or programmed to change a timing for shifting the traveling change-over valve from the first state to the second state in correspondence to modified example in the straight-traveling degree.

The working machine further includes a first traveling device provided on a left portion of the machine body, and a second traveling device provided on a right portion of the machine body. A first traveling motor configured to output a traveling power to the first traveling device and a second traveling motor configured to output a traveling power to the second traveling device are each provided as the traveling motor. The traveling pump is configured to rotate the first traveling motor and the second traveling motor. The traveling change-over valve is configured to shift the rotation speed of the first and second traveling motors between the first speed and the second speed.

According to the working machine mentioned above, it is possible to easily reduce a shift shock.

DETAILED DESCRIPTION OF THE PREFERRED EMBODIMENTS

A preferred embodiment of a hydraulic system for a working machine and the working machine having the hydraulic system will be described below with reference to drawings.

Figure 10:
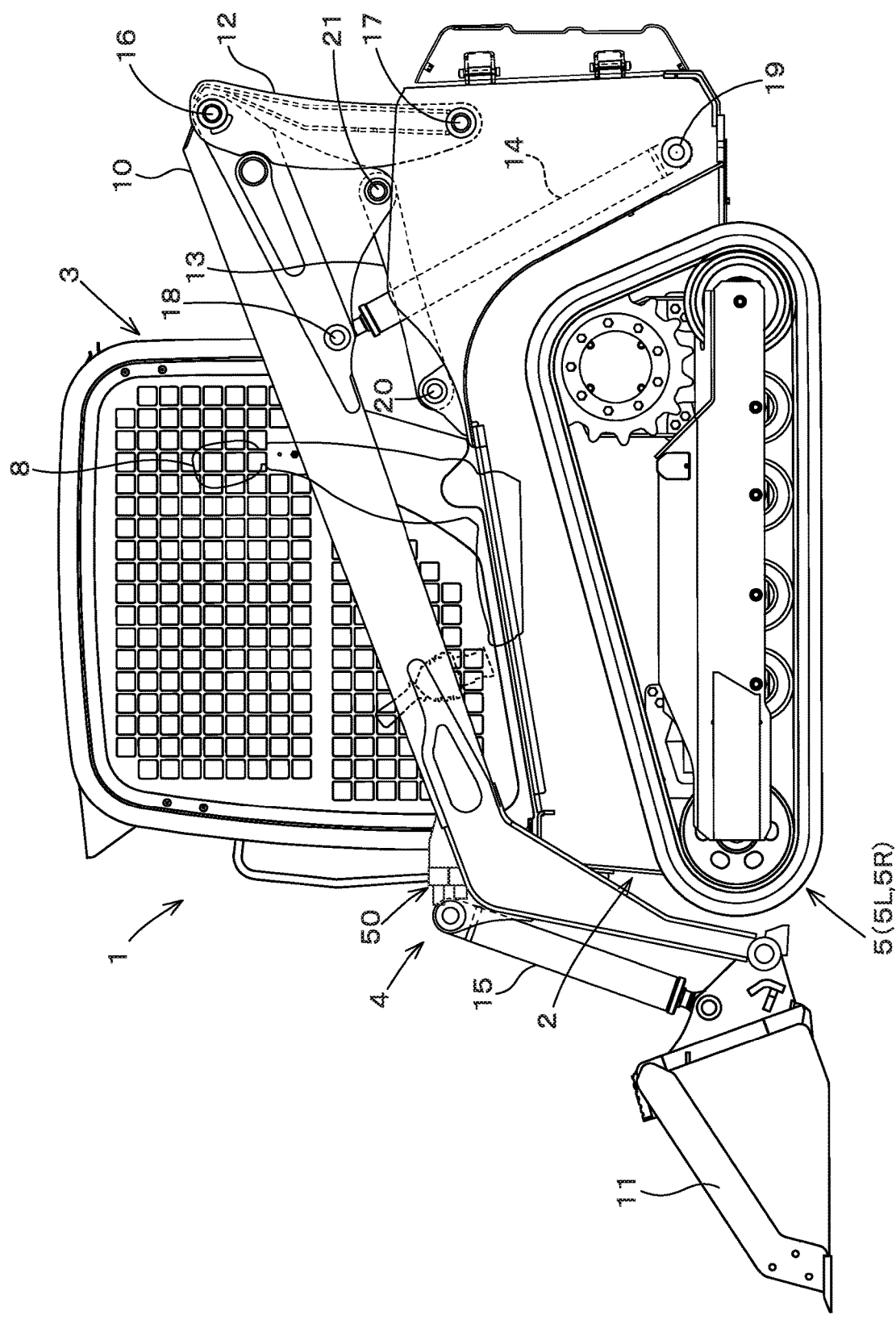
FIG. 10 is a side view showing a track loader that is an example of the working machine.

FIG. 10 is a side view of a working machine according to an embodiment. FIG. 10 shows a compact track loader as an example of the working machine. However, the working machine according to the embodiment is not limited to the compact track loader. The working machine may be another typed loader, such as a skid steer loader. In addition, the working machine may be a working machine other than the loader working machine.

As shown in FIG. 10, the working machine 1 includes a machine body 2, a cabin 3, a working device 4, and a traveling device 5. In the embodiment, a direction corresponding to a forward direction from a driver siting on a driver seat 8 of the working machine 1 (leftward in FIG. 10) is referred to as "front" or "forward", a rearward direction from the driver (rightward in FIG. 10) is referred to as "rear" or "rearward", a leftward direction from the driver (a front surface side of FIG. 10) is referred to as "left" or "rearward", and a rightward direction from the driver (a back surface side of FIG. 10) is referred to as "right" or "rightward". A horizontal direction orthogonal to a fore-and-aft direction is referred to as a machine width direction. A direction from the center of the machine body 2 to the right or left is referred to as a machine outward direction. In other words, the machine outward direction is one machine width direction away from the machine body 2. A direction opposite to the machine outward direction is referred to as a machine inward direction. In other words, the machine inward direction is the other machine width direction approaching the machine body 2.

The cabin 3 is mounted on the machine body 2. The cabin 3 incorporates the driver seat 8. The working device 4 is attached to the machine body 2. The traveling device 5 is disposed outside the machine body 2. A prime mover 32 is mounted on a rear inside portion of the machine body 2.

The working device 4 has booms 10, a working tool (bucket 11, for example), lift links 12, control links 13, boom cylinders 14, and bucket cylinders 15.

The booms 10 are arranged on right and left sides of the cabin 3 swingably up and down. The working tool is, for example, a bucket 11. The bucket 11 is disposed on a tip portion (front end portion) of the boom 10 and is swingable up and down. The lift links 12 and the control links 13 support base portions (that is, rear portions) of the booms 10 so that the booms 10 can be swung up and down. The boom cylinders 14 are extended and contracted to lift and lower the booms 10. The bucket cylinders 15 are extended and contracted to swing the bucket 11 up and down.

Front portions of the right and left booms 10 are connected to each other by a deformed connecting pipe. Base portions (that is, rear potions) of the booms 10 are connected to each other by a circular connecting pipe.

The lift links 12, control links 13, and boom cylinders 14 are arranged on right and left sides of the machine body 2 to correspond to the right and left booms 10.

The lift links 12 are extended vertically from rear portions of the base potions of the booms 10. Upper portions (that is, one ends) of the lift links 12 are pivotally supported on the rear portion of the base portions of the booms 10 via respective pivot shafts 16 (referred to as first pivot shafts) rotatably around their lateral axes. In addition, lower portions (that is, the other ends) of the lift links 12 are pivotally supported on a rearward portion of the machine body 2 via respective pivot shafts 17 (referred to as second pivot shafts) rotatably around their lateral axes. The second pivot shafts 17 are provided below the first pivot shafts 16.

Upper portions of the boom cylinders 14 are pivotally supported via respective pivot shafts 18 (referred to as third pivot shafts) rotatably around their lateral axes. The third pivot shafts 18 are provided at the base portions of the booms 10, especially, at front portions of the base portions. Lower portions of the boom cylinders 14 are pivotally supported respective pivot shafts 19 (referred to as fourth pivot shafts) rotatably around their lateral axes. The fourth pivot shafts 19 are provided closer to a lower portion of the rear portion of the machine body 2 and below the third pivot shafts 18.

The control links 13 are provided in front of the lift links 12. One ends of the control links 13 are pivotally supported via respective pivot shafts 20 (referred to as fifth pivot shafts) rotatably around their lateral axes. The fifth pivot shafts 20 are provided on the machine body 2 forward of the lift links 12. The other ends of the control links 13 are pivotally supported via respective pivot shafts 21 (referred to as sixth pivot shafts) rotatably around their lateral axes. The sixth pivot shafts 21 are provided on the booms 10 forwardly upward from the second pivot shafts 17.

By extending and contracting the boom cylinders 14, the booms 10 are swung up and down around the first pivot shafts 16 with the base portions of the booms 10 supported by the lift links 12 and the control links 13, thereby lifting and lowering the tip end portions of the booms 10. The control links 13 are swung up and down around the fifth pivot shafts 20 by the vertical swinging of the booms 10. The lift links 12 are swung back and forth around the second pivot shafts 17 by the vertical swinging of the control links 13.

An alternative working tool instead of the bucket 11 can be attached to the front portions of the booms 10. For example, the alternative working tool is an attachment (that is, an auxiliary attachment) such as a hydraulic crusher, a hydraulic breaker, an angle broom, an earth auger, a pallet fork, a sweeper, a mower, a snow blower, or the like.

A connecting member 50 is provided at the front portion of the left boom 10. The connecting member 50 is a device configured to connect a hydraulic equipment attached to the auxiliary attachment to a first piping member such as a pipe provided on the boom 10. Specifically, the first piping member can be connected to one end of the connecting member 50, and a second piping member connected to the hydraulic equipment of the auxiliary attachment can be connected to the other end. In this manner, an operation fluid flowing in the first piping member passes through the second piping member and is supplied to the hydraulic equipment.

The bucket cylinders 15 are arranged respectively closer to the front portions of the booms 10. The bucket cylinders 15 are extended and contracted to swing the bucket 11.

Each of the traveling devices 5 (first traveling device 5L and second traveling device 5R) on the left or right portion is a crawler type (including semi-crawler type) traveling device in the present embodiment. A wheel-type traveling device having front wheels and rear wheels may also be adopted.

The prime mover 32 is an internal combustion engine such as a diesel engine, a gasoline engine, an electric motor, or the like. In the embodiment, the prime mover 32 is the diesel engine, but is not limited thereto.

Next, the hydraulic system for the working machine according to a first embodiment will be described.

Figure 1:
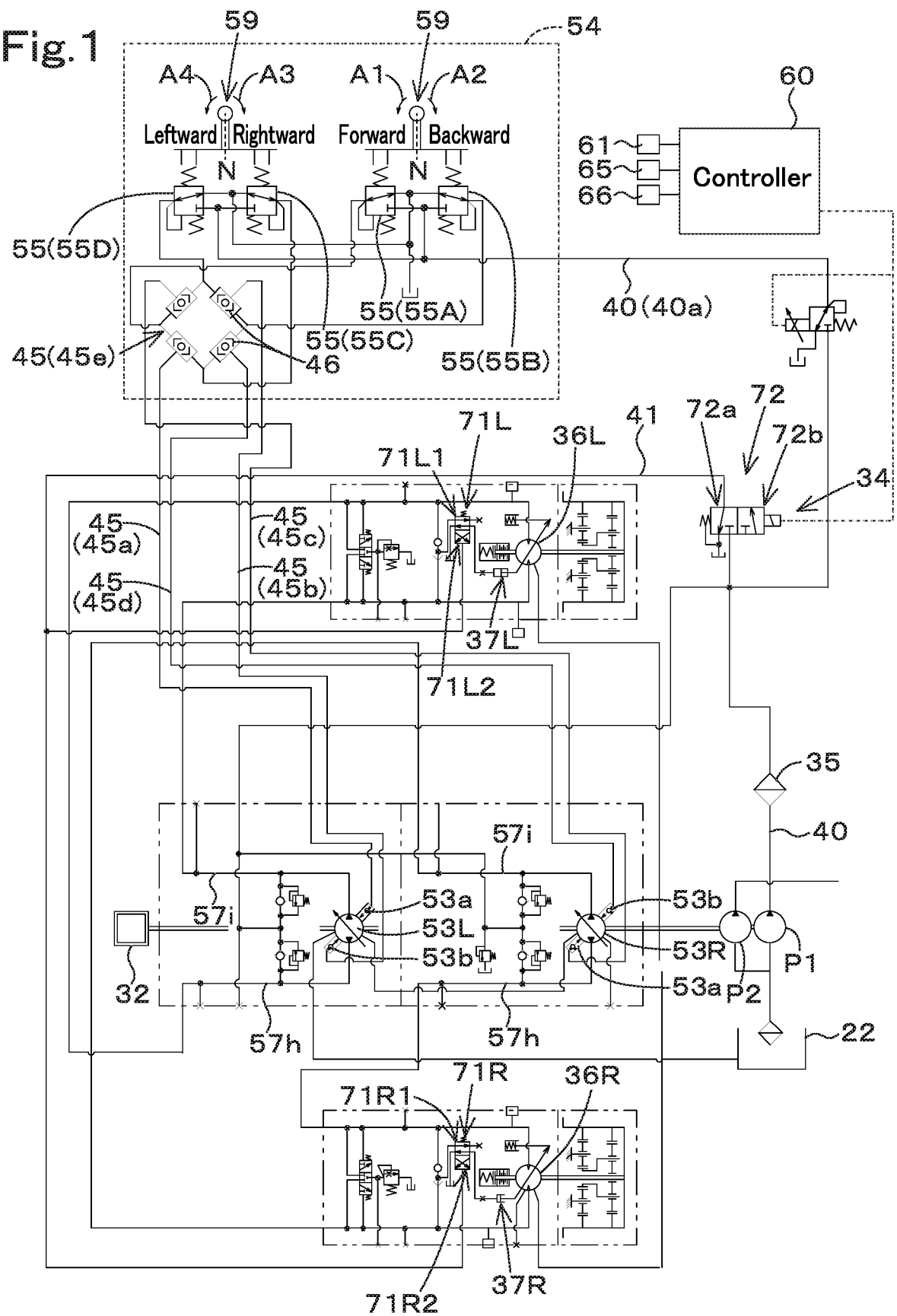
FIG. 1 is a view showing a hydraulic system (a hydraulic circuit) for a working machine according to a first embodiment.

As shown in FIG. 1, the hydraulic system for the working machine is capable of driving the traveling devices 5. The hydraulic system for the working machine includes a first traveling pump 53L, a second traveling pump 53R, a first traveling motor 36L and a second traveling motor 36R.

The first traveling pump 53L and the second traveling pump 53R are pumps configured to be driven by a power of the prime mover 32. Specifically, the first traveling pump 53L and the second traveling pump 53R are swash plate type variable displacement axial pumps configured to be driven by the power of the prime mover 32. Each of the first traveling pump 53L and the second traveling pump 53R includes pressure-receiving portions 53a and 53b to which a pilot pressure is applied. An angle of the swash plate is changed by the pilot pressure applied to the pressure-receiving portions 53a and 53b. By changing the angle of the swash plate, outputs (delivering amounts of hydraulic fluid) and delivery directions of the first traveling pump 53L and the second traveling pump 53R can be changed.

The first traveling pump 53L and the first traveling motor 36L are connected to each other by a circulation fluid line 57h so that the hydraulic fluid delivered by the first traveling pump 53L is supplied to the first traveling motor 36L through the circulation fluid line 57h. The second traveling pump 53R and the second traveling motor 36R are connected to each other by a circulation fluid line 57i so that the hydraulic fluid delivered by the second traveling pump 53R is supplied to the second traveling motor 36R through the circulation fluid line 57i.

The first traveling motor 36L is a motor configured to transmit a power to a drive shaft of the traveling device 5 disposed on the left portion of the machine body 2. The first traveling motor 36L is configured to be rotated by hydraulic fluid delivered from the first traveling pump 53L and to change its rotation speed (number of rotations) according to a flow rate of the hydraulic fluid. A swash plate change-over cylinder 37L is connected to the first traveling motor 36L, so that the rotation speed (number of rotations) of the first traveling motor 36L can be changed by extending and contracting the swash plate change-over cylinder 37L in one and the other directions. That is, when the swash plate change-over cylinder 37L is contracted, the rotation speed of the first traveling motor 36L is set to a low speed stage (first speed), and when the swash plate change-over cylinder 37L is extended, the rotation speed of the first traveling motor 36L is set to a high speed stage (second speed). That is, the rotation speed of the first traveling motor 36L can be changed between the first speed that is the low speed stage and the second speed that is the high speed stage.

The second traveling motor 36R is a motor configured to transmit a power to a drive shaft of the traveling device 5 disposed on the right portion of the machine body 2. The second traveling motor 36L is configured to be rotated by hydraulic fluid delivered from the second traveling pump 53R and to change its rotation speed (number of rotations) according to a flow rate of the hydraulic fluid. A swash plate change-over cylinder 37R is connected to the second traveling motor 36R so that the rotation speed (number of rotations) of the second traveling motor 36L also can be changed by extending and contracting the swash plate change-over cylinder 37R in one and the other directions. That is, when the swash plate change-over cylinder 37R is contracted, the rotation speed of the second traveling motor 36R is set to a low speed stage (first speed), and when the swash plate change-over cylinder 37R is extended, the rotation speed of the second traveling motor 36R is set to a high speed stage (second speed). That is, the rotation speed of the second traveling motor 36L can be changed between the first speed that is the low speed stage and the second speed that is the high speed stage.

As shown in FIG. 1, the hydraulic system for the working machine has a traveling change-over valve 34. The traveling change-over valve 34 is configured to change the rotation speed (number of rotations) of the travel motors (first traveling motor 36L and second traveling motor 36R) between a first state where the rotation speed becomes the first speed and a second state where the rotation speed becomes the second speed. The traveling change-over valve 34 includes first change-over valves 71L and 71R and a second switching valve 72.

The first change-over valve 71L is a two-position change-over valve connected via a fluid line to the swashplate change-over cylinder 37L of the first traveling motor 36L and configured to be switched between the first position 71L1 and the second position 71L2. The first change-over valve 71L, when set at the first position 71L1, contracts the swash plate change-over cylinder 37L, and when set at the second position 71L2, extends the swash plate change-over cylinder 37L.

The first change-over valve 71R is a two-position change-over valve connected via a fluid line to the swashplate change-over cylinder 37R of the second traveling motor 36R and configured to be switched between the first position 71R1 and the second position 71R2. The first change-over valve 71R, when set at the first position 71R1, contracts the swash plate change-over cylinder 37R, and when set at the second position 71R2, extends the swash plate change-over cylinder 37R.

The second switching valve 72 is a solenoid valve that switches the first change-over valve 71L and the first change-over valve 71R, and is configured as a two-position switching valve shiftable based on magnetization between a first position 72a and a second position 72b. The second switching valve 72 is connected to the first change-over valve 71L and the first change-over valve 71R via a fluid line 41. The second switching valve 72, when set at the first position 72a, switches the first change-over valves 71L and 71R to the first positions 71L1 and 71R1, and when set at the second position 72b, switches the first change-over valves 71L and 71R to the second positions 71L2 and 71R2.

That is, when the second change-over valve 72 is set at the first position 72a, the first change-over valve 71L at the first position 71L1, and the first change-over valve 71R at the first position 71R1, the traveling change-over valve 34 enters the first state, and the rotation speed of the traveling motors (first traveling motor 36L and second traveling motor 36R) is set to the first speed. When the second switching valve 72 is set at the second position 72b, the first change-over valve 71L at the second position 71L2, and the first change-over valve 71R at the second position 71R2, the traveling change-over valve 34 enters the second state, and the rotation speed of the traveling motors (first traveling motor 36L and second traveling motor 36R) is set to the second speed.

Accordingly, the traveling change-over valve 34 allows the traveling motors (first traveling motor 36L and second traveling motor 36R) to switch between the first speed that is the low speed stage and the second speed that is the high speed stage.

The switching between the first speed and the second speed in the traveling motors can be performed by a change-over unit. The change-over unit is, for example, a change-over switch 61 connected to the controller 60 and can be operated by an operator or the like. The change-over unit (change-over switch 61) can be switched between an acceleration state where the rotation speed of the traveling motors is switched from the first speed (first state) to the second speed (second state) and a deceleration state where the rotation speed of the traveling motors is switched from the second speed (second state) to the first speed (first state).

The controller 60 is constituted of a CPU, an MPU or another semiconductor, electrical/electronic circuits, or the like. The controller 60 switches the traveling change-over valve 34 based on a switching operation of the change-over switch 61. The change-over switch 61 is a push switch. When the change-over switch 61 is pressed, for example, under a state where the traveling motor is at the first speed, an instruction to set the traveling motors to the second speed state (an instruction to set the traveling change-over valve 34 to the second state) is output to the controller 60. In addition, when the change-over switch 61 is pressed under a state where the travel motors are at the second speed, an instruction to set the travel motors to the first speed (an instruction to set the traveling change-over valve 34 to the first state) is output to the controller 60. The change-over switch 61 may be a push switch that can be held as being turned ON and OFF, and when the switch is turned OFF, an instruction to hold the traveling motors with their rotation speed set at the first speed is output to the controller 60, and when the switch is turned ON, an instruction to hold the traveling motors with their rotation speed set at the second speed is output to the controller 60.

When the controller 60 obtains the instruction to set the traveling change-over valve 34 into the first state, the controller 60 demagnetizes a solenoid of the second switching valve 72 to set the traveling change-over valve 34 in the first state. When the controller 60 obtains the instruction to set the traveling change-over valve 34 into the second state, the controller 60 magnetizes the solenoid of the second switching valve 34 to set the traveling change-over valve 34 to be in the second state by magnetizing a solenoid of the second switching valve 72.

The hydraulic system for the working machine is provided with a first hydraulic pump P1, a second hydraulic pump P2 and an operation device (traveling-operation device) 54. The first hydraulic pump P1 is a pump configured to be driven by power of the prime mover 32 and includes a constant displacement gear pump. The first hydraulic pump P1 is capable of delivering operation fluid stored in a tank 22. Specifically, the first hydraulic pump P1 delivers operation fluid that is mainly used for control. For convenience of explanation, the tank 22 that stores operation fluid may be referred to as an operation fluid tank. Of the operation fluid delivered from the first hydraulic pump P1, the operation fluid used for control is referred to as pilot fluid, and a pressure of the pilot fluid is referred to as a pilot pressure.

The second hydraulic pump P2 is a pump configured to be driven by power of the prime mover 32, and includes a constant displacement gear pump. The second hydraulic pump P2 is capable of delivering operation fluid stored in the tank 22 and, for example, supplies the operation fluid to fluid lines of a working system. For example, the second hydraulic pump P2 supplies operation fluid to control valves (that is, flow-rate control valves) that control the boom cylinders 14 for operating the booms 10, the bucket cylinders 15 for operating the bucket, and an auxiliary hydraulic actuator for operating the auxiliary hydraulic actuator.

The traveling operation device 54 (operation device) operates the traveling pumps (first traveling pump 53L and second traveling pump 53R) and can change angles of the swash plates of the traveling pumps (swash plate angles). The traveling operation device 54 includes an operation member 59, such as an operation lever, and a plurality of operation valves 55.

The operation member 59 is an operating member supported on the operation valves 55 and configured to swing in a lateral direction (machine width direction) or a fore-and-aft direction. That is, with reference to the neutral position N, the operation member 59 is operable to the right and to the left from a neutral position N, and to the front and to the rear from the neutral position N. In other words, the operation member 59 is capable of being swung in at least four directions with respect to the neutral position N. For convenience of explanation, the forward and backward directions, that is, the fore-and-aft directions, may be referred to as first directions. In addition, the rightward and leftward directions, that is, the lateral directions (that is, the machine width directions), are may be referred to as second directions.

The plurality of operation valves 55 are operated by a common, i.e., a single, operation member 59. The plurality of operation valves 55 are actuated based on the swinging of the operation member 59. A delivery fluid line 40 is connected to the plurality of operation valves 55, so that operation fluid (that is, pilot fluid) from the first hydraulic pump P1 can be supplied to the operation valves 55 through the output fluid line 40. The plurality of operation valves 55 include an operation valve 55A, an operation valve 55B, an operation valve 55C, and an operation valve 55D.

When the operation member 59 is swung forward (one of the opposite fore-and-aft directions (first directions)) (this operation is referred to as "forward operation"), the operation valve 55A changes a pressure of hydraulic fluid output according to the operation amount of the operation member 59 in the forward operation. When the operation member 59 is swung backward (the other of the opposite fore-and-aft directions (first directions)) (this operation is referred to as "backward operation"), the operation valve 55B changes a pressure of hydraulic fluid output according to the operation amount of the operation member 59 in the backward operation. When the operation member 59 is swung rightward (one of the opposite lateral directions (second directions)) (this operation is referred to as "rightward operation"), the operation valve 55C changes a pressure of hydraulic fluid output according to the operation amount of the operation member 59 in the rightward operation. When the operation member 59 is swung leftward (the other of the opposite lateral directions (second directions)) (this operation is referred to as "leftward operation"), the operation valve 55D changes a pressure of hydraulic fluid output according to the operation amount of the operation member 59 in the leftward operation.

The plurality of operation valves 55 are fluidly connected to the traveling pumps (first traveling pump 53L, second traveling pump 53R) via a traveling fluid line 45. In other words, the traveling pumps (first traveling pump 53L and second traveling pump 53R) are hydraulic devices that can be actuated by hydraulic fluid output from the operation valves 55 (operation valve 55A, operation valve 55B, operation valve 55C, and operation valve 55D).

The traveling fluid line 45 includes a first traveling fluid line 45a, a second traveling fluid line 45b, a third traveling fluid line 45c, a fourth traveling fluid line 45d, and a fifth traveling fluid line 45e. The first traveling fluid line 45a is a fluid line connected to a pressure-receiving portion 53a of the travelling pump 53L. The second traveling fluid line 45b is a fluid line connected to a pressure-receiving portion 53b of the traveling pump 53L. The third traveling fluid line 45c is a fluid line connected to a pressure-receiving portion 53a of the travelling pump 53R. The fourth traveling fluid line 45d is a fluid line connected to a pressure-receiving portion 53b of the traveling pump 53R. The fifth traveling fluid line 45e is a fluid line that connects the operation valves 55 to the first traveling fluid line 45a, the second traveling fluid line 45b, the third traveling fluid line 45c, and the fourth traveling fluid line 45d.

When the operation member 59 is swung forward (in a direction of an arrowed line A1 in FIG. 1), the operation valve 55A is operated and a pilot pressure is output from the operation valve 55A. This pilot pressure is applied to the pressure-receiving portion 53a of the first traveling pump 53L via the first traveling fluid line 45a, and to the pressure-receiving portion 53a of the second traveling pump 53R via the third traveling fluid line 45c. In this manner, the swash plate angles of the first and second traveling pumps 53L and 53R are set so that the first and second traveling motors 36L and 36R rotate normally (forward traveling rotation), and the working machine 1 travels straight forward.

When the operation member 59 is swung backward (in a direction of an arrowed line A2 in FIG. 1), the operation valve 55B is operated and a pilot pressure is output from the operation valve 55B. This pilot pressure is applied to the pressure-receiving portion 53b of the first traveling pump 53L via the second traveling fluid line 45b, and to the pressure-receiving portion 53b of the second traveling pump 53R via the fourth traveling fluid line 45d. In this manner, the swash plate angles of the first and second traveling pumps 53L and 53R are so that the first and second traveling motors 36L and 36R rotate reversely (backward traveling rotation), and the working machine 1 travels straight backward.

When the operation member 59 is swung rightward (in a direction of an arrowed line A3 in FIG. 1), the operation valve 55C is operated and a pilot pressure is output from the operation valve 55C. This pilot pressure is applied to the pressure-receiving portion 53a of the first traveling pump 53L via the first traveling fluid line 45a, and to the pressure-receiving portion 53b of the second traveling pump 53R via the fourth traveling fluid line 45d. In this manner, the swash plate angles of the first and second traveling pumps 53L and 53R are set so that the first traveling motor 36L rotates normally and the second traveling motor 36R rotates reversely, and the working machine 1 turns to the right.

When the operation member 59 is swung leftward (in a direction of an arrowed line A4 in FIG. 1), the operation valve 55D is operated and a pilot pressure is output from the operation valve 55D. This pilot pressure is applied to the pressure-receiving portion 53a of the second traveling pump 53R via the third traveling fluid line 45c, and to the pressure-receiving portion 53b of the first traveling pump 53L via the second traveling fluid line 45b. In this manner, the swash plate angles of the first and second traveling pumps 53L and 53R are set so that the first traveling motor 36L rotates reversely and the second traveling motor 36R rotates normally, and the working machine 1 turns to the left.

When the operation member 59 is swung in an oblique direction, the rotations of the first traveling motor 36L and the second traveling motor 36R are controlled in direction and speed by the differential pressure between the pilot pressures acting on the pressure-receiving portion 53a and the pressure-receiving portion 53b, and the working machine 1 turns right or left while traveling forward or backward.

That is, when the operation member 59 is swung diagonally forwardly leftward, the working machine 1 turns left while traveling forward at a speed corresponding to the swing angle of the operation member 59. When the operation member 59 is swung diagonally forwardly rightward, the working machine 1 turns right while traveling forward at a speed corresponding to the swing angle of the operation member 59. When the operation member 59 is swung diagonally backward leftward, the working machine 1 turns left while traveling backward at a speed corresponding to the swing angle of the operation member 59. When the operation member 59 is swung diagonally backwardly rightward, the working machine 1 turns right while traveling backward at a speed corresponding to the swing angle of the operation member 59.

The controller 60 is connected to an accelerator 65 operable to set a target rotation speed of the prime mover 32. The accelerator 65 is provided in the vicinity of the driver's seat 8. The accelerator 65 is a swingably-supported accelerator lever, a swingably-supported accelerator pedal, a rotatably-supported accelerator knob, a slidably-supported accelerator slider, or the like. The accelerator 65 is not limited to the examples mentioned above. The controller 60 is connected to a rotation detector 66 configured to detect an actual rotation speed of the prime mover 32. By means of the rotation detector 66, the controller 60 is capable of knowing an actual rotation speed of the prime mover 32. Based on an operation amount of the accelerator 65, the controller 60 sets a target rotation speed and controls an actual rotation speed so as to reach the set target rotation speed.

The controller 60 performs a shock-mitigation control to reduce a prime mover speed when switching the traveling change-over valve 34 from the second state (second speed) to the first state (first speed), i.e., when reducing the rotation speed of the traveling motors from the second speed to the first speed.

The shock-mitigation control in deceleration will be described in detail below.

Figure 2:
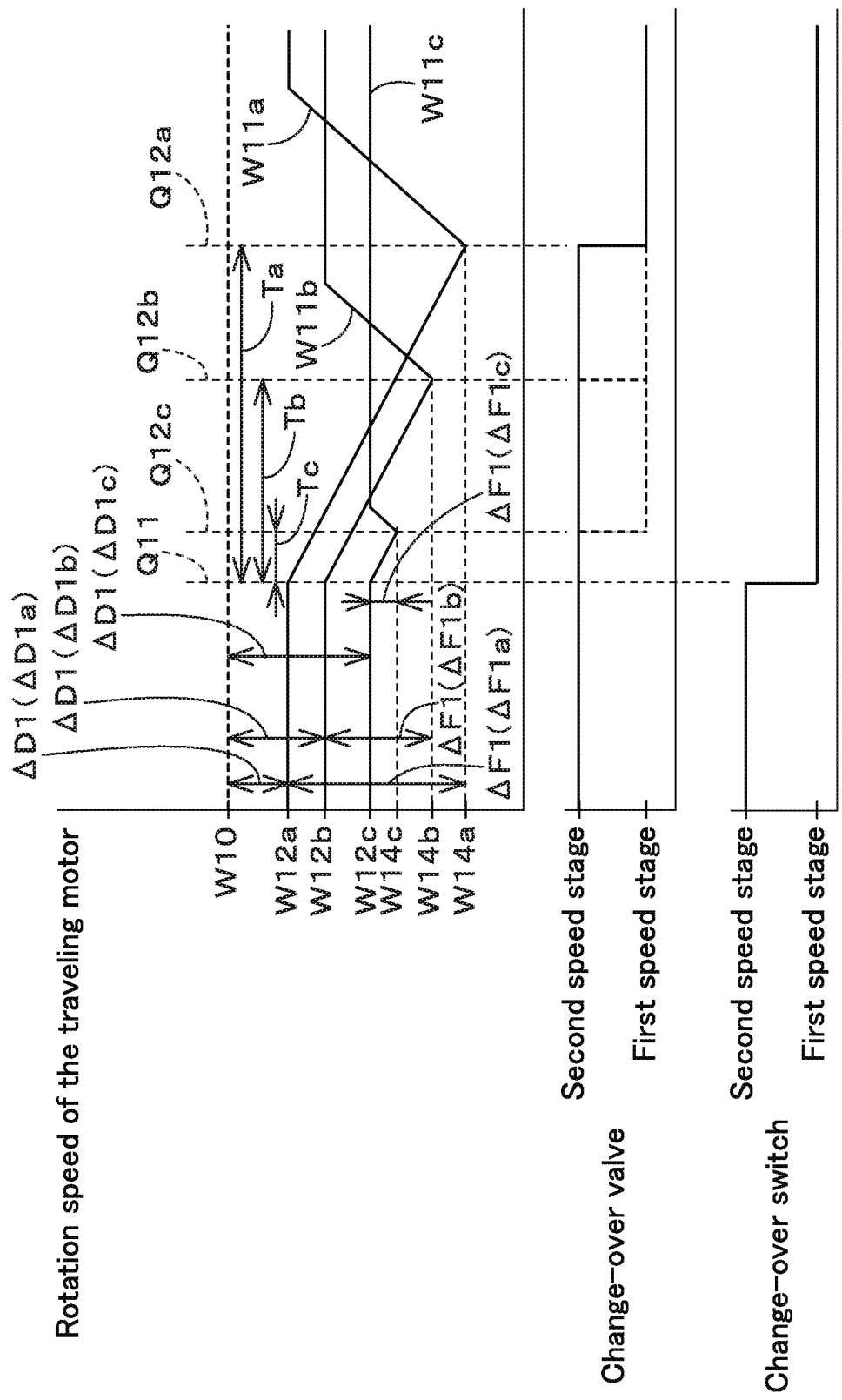
FIG. 2 is a view showing a relationship between a rotation speed of a prime mover and switching of a traveling motor according to a case where the traveling motor is decelerated.

FIG. 2 shows a relationship between a rotation speed of the prime mover (target rotation speed W10, actual rotation speeds W12a, W12b, W12c) and the speed-switching of the traveling motors in the shock-mitigation control during deceleration. As shown in FIG. 2, the controller 60 sets a reduction amount ΔF1 of a rotation speed of the prime mover in the shock-mitigation control based on a drop amount ΔD1 that is a difference between the target rotation speed W10 of the prime mover 32 and the actual rotation speeds W12a, W12b and W12c of the prime mover 32, and reduces a shift shock according to the reduction amount ΔF1.

Specifically, it is supposed that the change-over switch (change-over SW) 61 is operated at time point Q11, and the controller 60 obtains a deceleration instruction (first speed instruction) to change the speed stage from the second state (second speed) to the first state (first speed).

When the controller 60 obtains the first speed instruction, the controller 60 obtains drop amount ΔD1 (ΔD1a, ΔD1b, ΔD1c) by subtracting each of the actual rotation speeds W12a, W12b, and W12c from the target rotation speed W10. When the controller 60 obtains the drop amount ΔD1 (ΔD1a, ΔD1b, ΔD1c), the controller 60 sets the reduction amount ΔF1 (ΔF1a, ΔF1b, ΔF1c) based on the drop amount ΔD1 (ΔD1a, ΔD1b, ΔD1c). In setting the reduction amount ΔF1, the controller 60 increases the reduction amount ΔF1 when the drop amount ΔD1 is small, and decreases the reduction amount ΔF1 when the drop amount ΔD1 is large.

For example, at a time point Q11, a dop amount ΔD1a is obtained, and the controller 60 sets a reduction amount ΔF1a. Alternatively, at time point Q11, a drop amount ΔD1b is obtained, the controller 60 sets a reduction amount ΔF1b. Alternatively, at time point Q11, a drop amount ΔD1c is obtained, the controller 60 sets a reduction amount ΔF1c.

Thus, the controller 60 determines the reduction amount ΔF1 (ΔF1a, ΔF1b, ΔF1c) depending on the drop amount ΔD1 (ΔD1a, ΔD1b, ΔD1c) obtained at the time point Q11. For example, a characteristic map showing a relationship between the drop amount ΔD1 and the reduction amount ΔF1 is previously stored in the storage device. The drop amount ΔD1 and the reduction amount ΔF1 are inversely proportional to each other. The controller 60 determines the reduction amount ΔF1 corresponding to the drop amount ΔD1 by using the characteristic map. The controller 60 may make the reduction amount ΔF1 greater than a specified amount when the drop amount ΔD1 is less than or equal to the specified amount, or may make the reduction amount ΔF1 less than the specified amount when the drop amount ΔD1 is greater than or equal to the specified amount.

Once the reduction amount ΔF1 is set, the controller 60 sets the value obtained by subtracting the reduction amount ΔF1 (ΔF1a, ΔF1b, ΔF1c) from the actual rotation speed W12a, W12b or W12c to the mitigation value W14a, W14b or W14c of the prime mover in the shock-mitigation control. For example, when the drop amount is ΔD1a, the controller 60 sets, as the mitigation value, the value W14a which is obtained by subtracting the reduction amount ΔF1a from the actual rotation speed W12a. When the drop amount is ΔD1b, the controller 60 sets, as the mitigation value, the value W14b which is obtained by subtracting the reduction amount ΔF1b from the actual rotation speed W12b. When the drop amount is ΔD1c, the controller 60 sets, as the mitigation value, the value W14c which is obtained by subtracting the reduction amount ΔF1c from the actual rotation speed W12c.

After setting the mitigation values W14a, W14b and W14c, the controller 60 decreases an actual rotation speed of the prime mover until the reduced actual rotation speed of the prime mover reaches the mitigation value W14a, W14b or W14c.

Specifically, when the drop amount is ΔD1a at a time point Q11, the controller 60 decreases an actual rotation speed of the prime mover toward the mitigation value W14a, as descending along a line W11a. When the reduced actual rotation speed of the prime mover reaches the mitigation value W14a at a time point Q12a, the controller 60 outputs a signal to demagnetize the solenoid of the traveling change-over valve 34 to switch the traveling change-over valve (change-over valve) 34 from the second state (second speed) to the first state (first speed), as shown in a graph of the change-over valve control signal corresponding to the line W11a. After the time point Q12a, an actual rotation speed is restored to a target rotation speed (original actual rotation speed W12a), as rising along the line W11a.

Alternatively, when the drop amount is ΔD1b at a time point Q11, the controller 60 decreases an actual rotation speed of the prime mover toward the mitigation value W14b, as descending along a line W11b. When the reduced actual rotation speed of the prime mover reaches the mitigation value W14b at a time point Q12b, the controller 60 outputs a signal to demagnetize the solenoid of the traveling change-over valve 34 to switch the traveling change-over valve (change-over valve) 34 from the second state (second speed) to the first state (first speed), as shown in a graph of the change-over valve control signal corresponding to the line W11b. After the time point Q12b, an actual rotation speed is restored toward a target rotation speed (original actual rotation speed W12b), rising along the line W11b.

Alternatively, when the drop amount is ΔD1c at a time point Q11, the controller 60 decreases an actual rotation speed of the prime mover toward the mitigation value W14c, as descending along a line W11c. When the reduced actual rotation speed of the prime mover reaches the mitigation value W14c at a time point Q12c, the controller 60 outputs a signal to demagnetize the solenoid of the traveling change-over valve 34 to switch the traveling change-over valve (change-over valve) 34 from the second state (second speed) to the first state (first speed), as shown in a graph of the change-over valve control signal corresponding to the line W11c. After the time point Q12c, an actual rotation speed is restored to a target rotation speed (original actual rotation speed W12c), as rising along the line W11c.

Now, focusing on each of mitigation periods Ta, Tb and Tc from the time point Q11, which is the starting point of the reduction of the actual rotation speed of the prime mover, to each of the time points Q12a, Q12b and Q12c, which is the end point of the reduction of the actual rotation speed of the prime mover, that is, the mitigation period Ta, Tb or Tc for which the actual rotation speed of the prime mover is reduced until reaching the corresponding mitigation value W14a, W14b or W14c, the controller 60 keeps a constant reduction rate of the actual rotation speed of the prime mover defined as a first reduction rate. That is, for each of the mitigation periods Ta, Tb and Tc, the controller 60 keeps a constant slope of each of the respective lines W11a, W11b and W11c.

The traveling change-over valve 34 is switched between the first state and the second state at any of the different time points Q12a, Q12b and Q12c. Therefore, the controller 60 is configured to change a timing for switching the traveling change-over valve 34 between the first state and the second state in correspondence to the drop amount D1.

In the above-described embodiment, for each of the mitigation periods Ta, Tb and Tc, the actual rotation speed of the prime mover is reduced at a reduction rate that is kept constant for the corresponding mitigation period Ta, Tb or Tc from the start to the end. Alternatively, the reduction rate may be changed at an intermediate point of the mitigation period.

Figure 3:
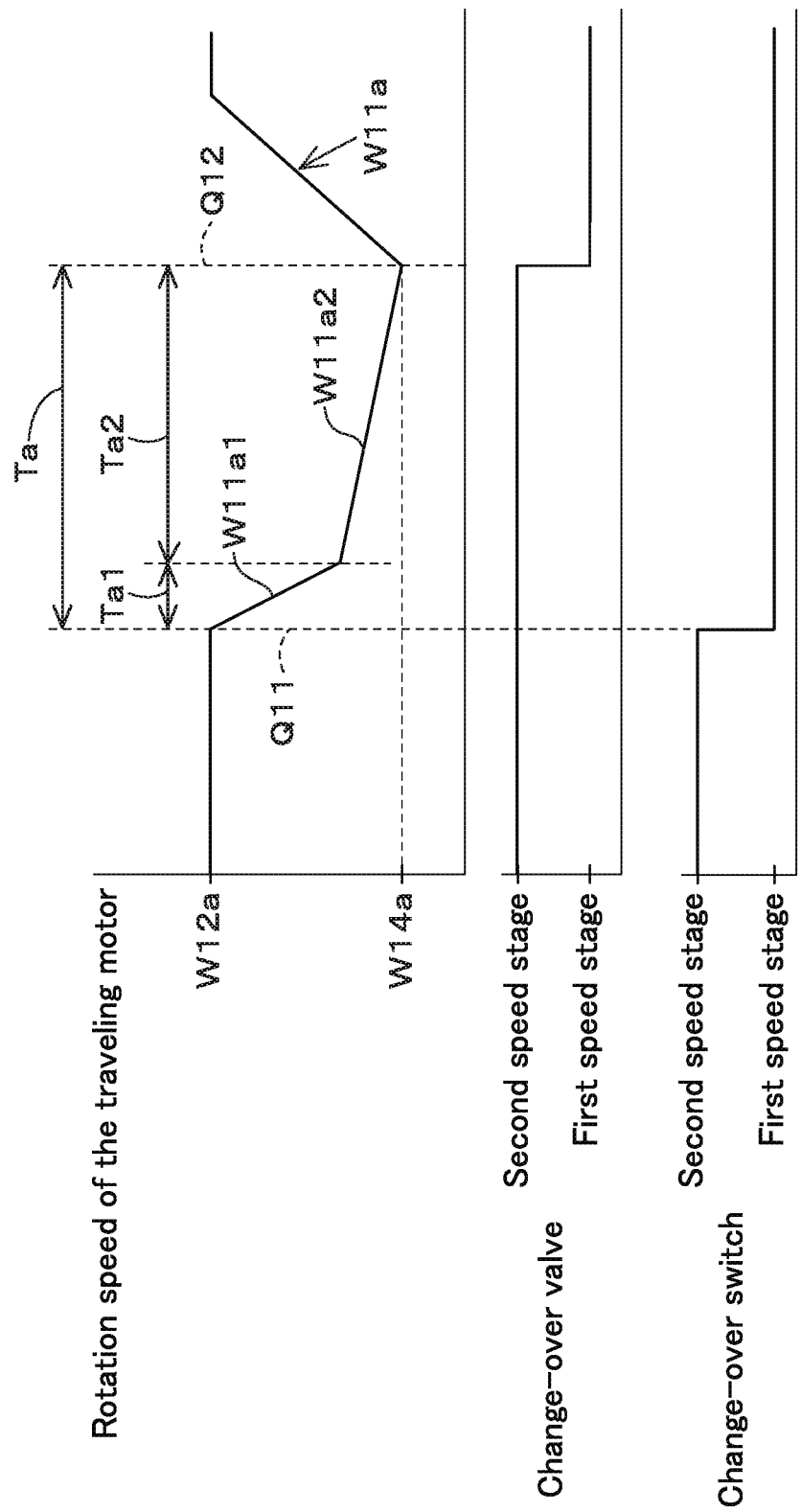
FIG. 3 is a view showing a relationship between the rotation speed of the prime mover and switching of the traveling motor according to the case where the traveling motor is decelerated.

FIG. 3 shows a modified example in which the reduction rate of an actual rotation speed of the prime mover is changed at an intermediate point of the mitigation period Ta.

When the controller 60 obtains the first speed instruction and calculates the mitigation value W14a based on the drop amount ΔD1a, the controller 60 sets a reduction rate of the prime mover, in a section (first section) Ta1 defined as a first part of the mitigation period Ta from the start to the intermediate point, to a second reduction rate, and sets the reduction rate of the prime mover, in a section (second section) Ta2 defined as a second part of the mitigation period Ta from the intermediate point to the end, to a third reduction rate, as shown in FIG. 3. That is, while the line W11a indicates variation of an actual rotation speed of the prime mover for the mitigation period Ta, the controller 60 sets the second reduction rate in the first section Ta1 based on a slope of a line W11a1 in the line W11a, and the third reduction rate for the second section Ta2 in the mitigation period Ta based on a slope of a line W11a2 in the line W11a. The controller 60 sets the second reduction rate (slope of line W11a1) as a value greater than the third reduction rate (slope of line W11a2).

In the modified example, the second and third reduction rates setting based on the line W11a is described. However, other lines W11b and W11c may be used to set the second and third reduction rates in the same way as the setting with the line W11a. In this case, the drop amount ΔD1a should be read as the drop amount ΔD1b or ΔD1c, the mitigation value W14a should be read as the mitigation value W14b or W14c, the mitigation period Ta should be read as the mitigation period Tb or Tc, the line W11a should be read as the line W11b or W11c, the line W11a1 should be read as a line W11b1 or W11c1, the line W11a2 should be read as a line W11b2 or W11c2, the first section Ta1 should be read as a first section Tb1 or Tc1, and the second section Ta2 should be read as a second section Tb2 or Tc2.

In the above-mentioned embodiment, the traveling operation device 54 is hydraulically operated to change pilot pressures acting on the traveling pumps (first traveling pump 53L and second traveling pump 53R) by means of the operation valves 55. However, as shown in FIG. 4, the traveling operation device 54 may be an electrically operable device.

Figure 4:
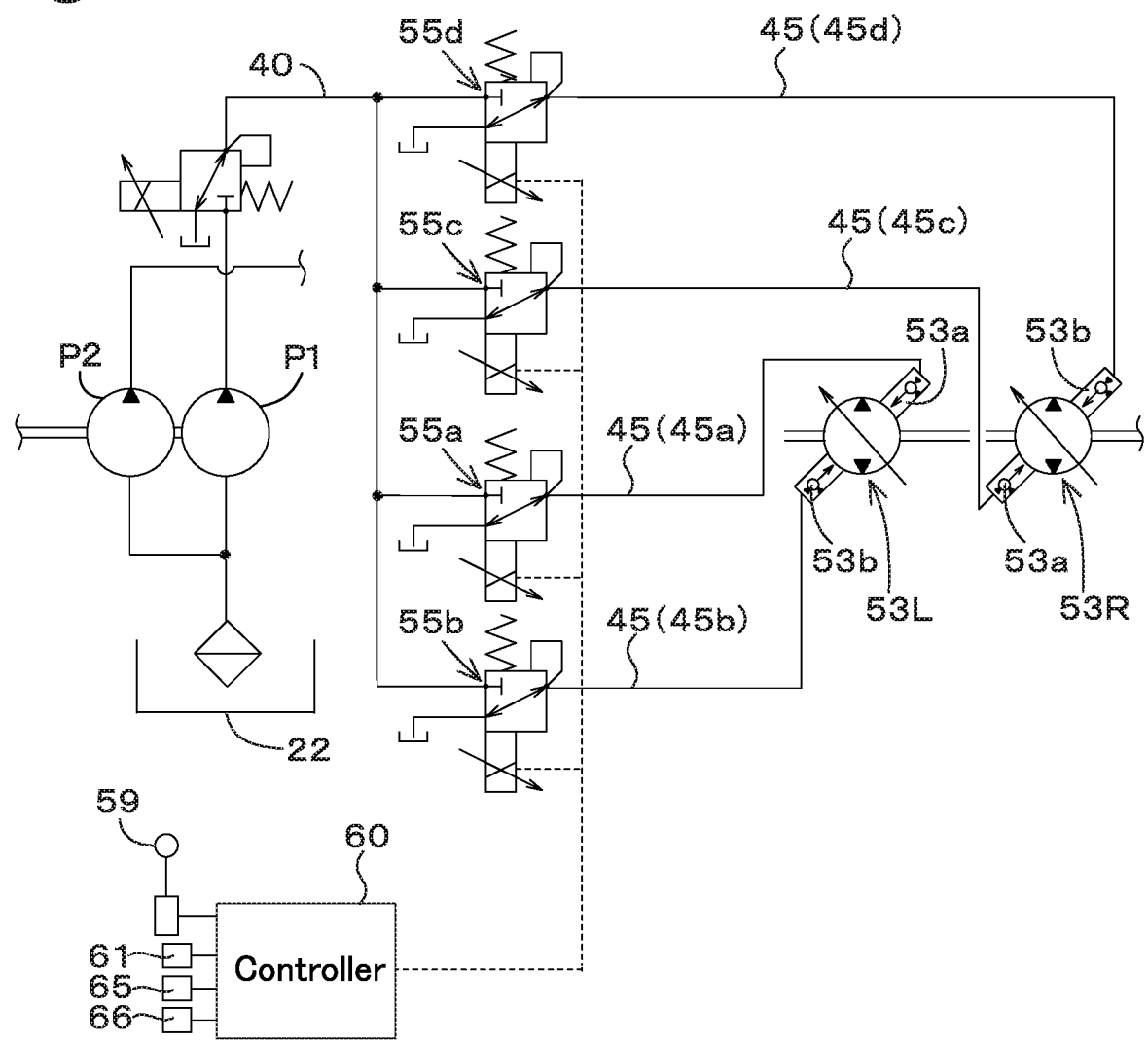
FIG. 4 is a view showing a modified example where an operation device is replaced by another operation device such as a joy stick configured to electrically operate.

As shown in FIG. 4, the traveling operation device 54 is provided with the operation member 59 swingable in the lateral direction (machine width direction) or in the fore-and-aft direction, and proportional solenoid valves serving as the operation valves 55 (including the operation valves 55A, 55B, 55C, and 55D). The controller 60 is connected to an operation detection sensor which detects an operation amount and operational direction of the operation member 59. The controller 60 controls the operation valves 55 (including the operation valves 55A, 55B, 55C, and 55D) based on the operation amount and operational direction detected by the operation detection sensor.

When the operation member 59 is operated to the front (the direction A1, see FIG. 1), the controller 60 outputs a control signal to the operation valves 55A and 55C to swing the swash plates of the first traveling pump 53L and the second traveling pump 53R in the direction for normally rotating the first traveling motor 36L and the second traveling motor 36R (for forward traveling).

When the operation member 59 is operated to the rear (the direction A2, see FIG. 1), the controller 60 outputs a control signal to the operation valves 55B and 55D to swing the swash plates of the first traveling pump 53L and the second traveling pump 53R in the direction for reversely rotating the motors (for backward traveling).

When the operation member 59 is operated to the right (the direction A3, see FIG. 1), the controller 60 outputs a control signal to the operation valve 55A and the operation valve 55D to swing the swash plate of the first traveling pump 53L in the direction for normally rotating the first traveling motor 36L and to swing the swash plate of the second traveling pump 53R in the direction for reversely rotating the second traveling motor 36R.

When the operation member 59 is operated to the left (the direction A4, see FIG. 1), the controller 60 outputs a control signal to the operation valve 55B and the operation valve 55C to swing the swash plate of the first traveling pump 53L in the direction for reversely rotating the first traveling motor 36L and to swing the swash plate of the second traveling pump 53R in the direction for normally rotating the second traveling motor 36R.

The working machine 1 includes the prime mover 32, the traveling pumps 53L and 53R driven by power of the prime mover 32 so as to deliver operation fluid, the traveling motors 36L and 36R configured to be rotated by the operation fluid delivered from the traveling pumps 53L and 53R, the traveling motors 36L and 36R having a rotation speed shiftable between the first speed and the second speed that is higher than the first speed, the machine body provided thereon with the prime mover 32, the traveling pumps 53L and 53R and the traveling motors 36L and 36R, the traveling change-over valve 34 shiftable between the first state where the rotation speed of the traveling motors 36L and 36R is set to the first speed and the second state where the rotation speed of the traveling motors 36L and 36R is set to the second speed, and the controller 60 configured or programmed to perform the shock-mitigation control for reducing a rotation speed of the prime mover 32 when the traveling change-over valve 34 is shifted from the second state to the first state. The controller 60 is configured or programmed to determine a reduction amount of rotation speed of the prime mover 32 reduced by the shock mitigation control based on a drop amount $\Delta D1$ defined as a difference between a target rotation speed of the prime mover 32 and an actual rotation speed of the prime mover 32.

According to this configuration, the reduction amount $\Delta F1$ of a rotation speed of the prime mover 32 is set according to a load on the prime mover 32, i.e., the drop amount $\Delta D1$ that is a difference between the target rotation speed of the prime mover 32 and an actual rotation speed of the prime mover 32. Accordingly, the actual rotation speed of the prime mover 32 can be reduced (lowered) in correspondence to the drop amount $\Delta D1$ when the shock-mitigation control is performed, thereby improving workability.

The controller 60 is configured or programmed to calculate a mitigation value of the prime mover 32 in the shock mitigation control by subtracting the reduction amount $\Delta F1$ from the actual rotation speed of the prime mover 32.

According to this configuration, the actual rotation speed of the prime mover 32 during deceleration to be set appropriately, even when the actual rotation speed of the prime mover 32 is dropped due to the load.

When a period for the shock mitigation control until the actual rotation speed of the prime mover 32 reduced by the shock mitigation control reaches the mitigation value is defined as the mitigation period Ta, Tb or Tc, the controller 60 is configured or programmed to reduce the actual rotation speed of the prime mover at the first reduction rate kept constant for the mitigation period Ta, Tb or Tc from the start point thereof to the end point thereof. According to this configuration, the outputs of the traveling pumps 53L and 53R can be reduced smoothly and gradually, so that the shift shock can be reduced more efficiently.

When a period for the shock mitigation control until the actual rotation speed of the prime mover 32 reduced by the shock mitigation control reaches the mitigation value is defined as the mitigation period Ta, Tb or Tc, the controller 60 is configured or programmed to reduce the actual rotation speed of the prime mover 32 at the second reduction rate for the first part of the mitigation period Ta, Tb or Tc from the start point thereof to the intermediate point thereof, and to reduce the actual rotation speed of the prime mover 32 at the third reduction rate less than the second reduction rate for the second part of the mitigation period Ta, Tb or Tc from the intermediate point thereof to the end point thereof. According to this configuration, the responsiveness of the traveling pumps 53L and 53R can be improved in the shock-mitigation control.

The controller 60 is configured or programmed to change a timing for shifting the traveling change-over valve 34 from the second state to the first state in correspondence to the drop amount $\Delta D1$. According to this configuration, a timing of the deceleration can be changed according to a load on the prime mover 32, thereby further improving the workability.

The working machine 1 further includes the change-over switch 61 operable to issue a speed-shift instruction selected between an acceleration instruction to shift the rotation speed of the traveling motors 36L and 36R from the first speed to the second speed and a deceleration instruction to shift the rotation speed of the traveling motors 36L and 36R from the second speed to the first speed, and the accelerator 65 operable to set a target rotation speed of the prime mover 32. When the change-over switch 61 is operated to issue the speed-shift instruction, the controller 60 is configured or programed to reduce the actual rotation speed of the prime mover 32 to the mitigation value determined based on the reduction amount $\Delta F1$, and to shift the traveling change-over valve 34 to either the first state or the second state in correspondence to the speed-shift instruction. According to this configuration, the actual rotation speed of the prime mover 32 can be sufficiently lowered before shifting speeds, thereby further improving reduction of the shift shock.

The controller 60 is configured or programmed to determine the reduction amount $\Delta F1$ based on the drop amount $\Delta D1$ in such a way that the reduction amount becomes larger as the drop amount $\Delta D1$ becomes smaller, and the reduction amount $\Delta F1$ becomes smaller as the drop amount $\Delta D1$ becomes larger. According to this configuration, when the load applied to the prime mover 32 is small and there is a margin in output of the prime mover 32, the reduction of the shift shock can be further improved. Moreover, when the load applied to the prime mover 32 is large and there is a margin in the output of the prime mover 32, the reduction of the shift shock can be moderated so that the actual rotation speed of the prime mover 32 after the reduction of the shift shock (after shifting speed) can be restored earlier while reducing the shift shock.

The working machine 1 further includes the first traveling device 5L provided on a left portion of the machine body 2, and the second traveling device 5R provided on a right portion of the machine body 2. The first traveling motor configured to output a traveling power to the first traveling device 5L and the second traveling motor configured to output a traveling power to the second traveling device 5R are each provided as the traveling motors 36L and 36R, the traveling pumps 53L and 53R are configured to rotate the first traveling motor and the second traveling motor, and the traveling change-over valve 34 is configured to shift the rotation speed of the first and second traveling motors between the first speed and the second speed. According to this configuration, the shift shock can be reduced more smoothly in the working machine 1 including the first traveling device 5L disposed on the left portion of the machine body 2 and the second traveling device 5R disposed on the right portion of the machine body 2.

The traveling change-over valve 34 is enough only if it is a valve configured to switch the traveling motors (first traveling motor 36L and second traveling motor 36R) between the first state for setting the first speed and the second state for setting the second speed. The traveling change-over valve 34 may be a proportional valve different from a directional change-over valve.

The traveling motor may be a motor having a neutral position (neutral) between the first and second speeds.

The travel motors (first traveling motor 36L and second traveling motor 36R) may be axial piston motors or radial piston motors. If the travelling motor is a radial piston motor, it is configured so that the traveling motors are set in the first speed when the motor capacity becomes large, and the traveling motors are set in the second speed, and so that the traveling motors are set in the second speed when the motor capacity becomes small.

Next, a hydraulic system for a working machine according to a second embodiment will be described. For convenience of explanation, components having the same functions as those of the first embodiment are given the same reference numerals, and their description is omitted.

The controller 60 performs the shock-mitigation control when switching the traveling change-over valve 34 from the first state (first speed) to the second state (second speed), that is, when increasing the rotation speed of the travel motors by shifting the speed stage from the first speed to the second speed.

Figure 5:
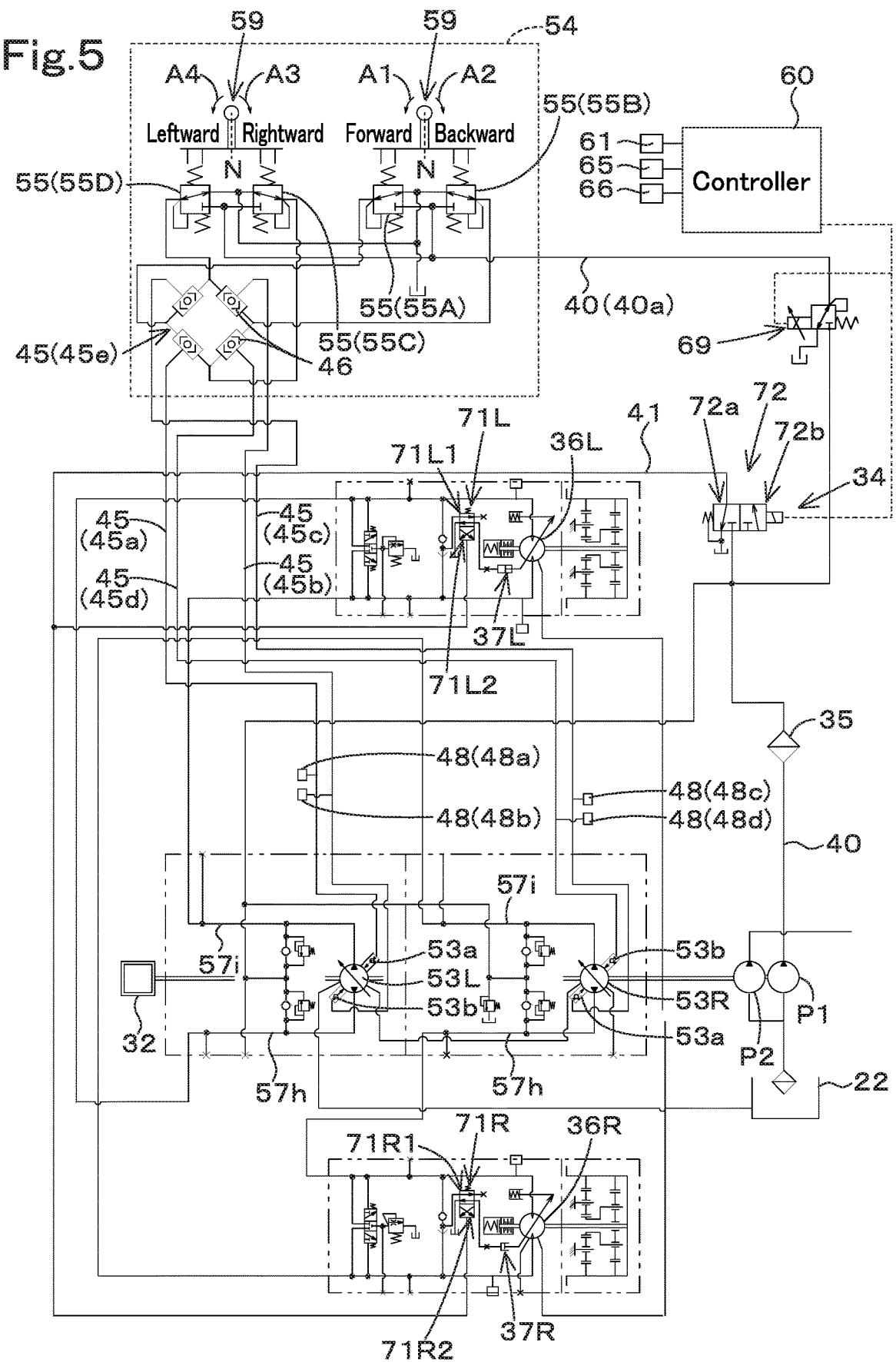
FIG. 5 is a view showing a hydraulic system (a hydraulic circuit) for a working machine according to a second embodiment.

As shown in FIG. 5, in the shock-mitigation control, the controller 60 reduces the shock of the gear shift by controlling an opening degree of an actuation valve 69. The actuation valve 69 is connected to a section 40a of a delivery fluid line 40 after branching and leading to the traveling operation device 54, i.e., upstream of the operation valve 55. The actuation valve 69 may be connected to a portion of the traveling fluid line 45 downstream of the operation valve 55.

The actuation valve 69 is a proportional solenoid valve (proportional valve), having an opening degree which can be changed by a control signal output from the controller 60. The control signal is, for example, a voltage, a current or the like. The actuation valve 69 is a valve whose opening degree increases as the control signal (voltage, current) output from the controller 60 becomes high, and decreases as the control signal (voltage, current) becomes low.

That is, in shock-mitigation control, the controller 60 decreases the opening degree of the actuation valve 69 by changing the control signal to be output to the actuation valve 69.

When performing the shock-mitigation control, the controller 60 sets the reduction amount in the opening degree of the actuation valve 69 based on a straight-traveling degree (straight traveling degree) of the working machine 1 (machine body 2). The straight-traveling degree can be determined based on the pressure of the hydraulic fluid in the traveling fluid line 45.

As shown in FIG. 5, at least one pressure detector 48 is connected to the traveling fluid line 45 to detect a pressure (pilot pressure) of hydraulic fluid in the traveling fluid line 45. The at least one pressure detector 48 includes a first pressure detector 48a, a second pressure detector 48b, a third pressure detector 48c, and a fourth pressure detector 48d. The first pressure detector 48a, the second pressure detector 48b, the third pressure detector 48c, and the fourth pressure detector 48d are connected to the controller 60.

The first pressure detector 48a is a sensor capable of detecting a first pilot pressure lf(t) which is a pressure of the hydraulic fluid in the first traveling fluid line 45a. The second pressure detector 48b is a sensor capable of detecting a second pilot pressure lb(t) which is a pressure of the hydraulic fluid in the second traveling fluid line 45b. The third pressure detector 48c is a sensor capable of detecting a third pilot pressure rf(t) which is a pressure of the hydraulic fluid in the third traveling fluid line 45c. The fourth pressure detector 48d is a sensor capable of detecting a fourth pilot pressure rb(t) which is a pressure of the hydraulic fluid in the fourth traveling fluid line 45d.

As shown in Equations (1) and (2), the controller 60 obtains a straight-traveling degree $S_{Bratio}(t)$ and a straight-traveling degree $S_{Fratio}(t)$ based on the first pilot pressure lf(t), the second pilot pressure lb(t), the third pilot pressure rf(t), and the fourth pilot pressure rb(t). When a ratio (rf(t)/lf(t)) is not within a predetermined range, the controller 60 sets larger one of the first pilot pressure lf(t) and the third pilot rf(t) as the first straight-traveling value $Pv_{Bpivot}$. When the ratio (rb(t)/lb(t)) is not within the predetermined range, the controller 60 sets larger one of the second pilot lb(t) and the fourth pilot rb(t) as the second straight-traveling value $Pv_{Fpivot}$.

(Equation)

$$S_{Fratio(t)} = \left(\frac{rf_{(t)} + lf_{(t)}}{2}\right) \Big/ pv_{Fpivot} \quad (1)$$

$$S_{Bratio(t)} = \left(\frac{rb_{(t)} + lb_{(t)}}{2}\right) \Big/ pv_{Bpivot}, \quad (2)$$

where $$pv_{Bpivot} = \max(rf_{(t)}, lf_{(t)}),$$

$$pv_{Fpivot} = \max(rb_{(t)}, lb_{(t)})$$

The controller 60 judges, based on the straight-traveling degree $S_{Bratio}(t)$ and the straight-traveling degree $S_{Fratio}(t)$, whether the working machine 1 travels straight or not. For example, when the straight-traveling degree $S_{Bratio}(t)$ or the straight-traveling degree $S_{Fratio}(t)$ is so large as to exceed 1.0, the controller 60 considers the working machine 1 (machine body 2) as traveling straight. When the straight-traveling degree $S_{Bratio}(t)$ or the straight-traveling degree $S_{Fratio}(t)$ is less than 1.0 and so small as close to zero, the controller 60 considers the working machine 1 as traveling in pivotal turn.

For convenience of explanation, the straight-traveling degree $S_{Bratio}(t)$ and the straight-traveling degree $S_{Fratio}(t)$ are each hereinafter simply referred to as "straight-traveling degree SV".

The shock-mitigation control in acceleration is described in detail below.

Figure 6:
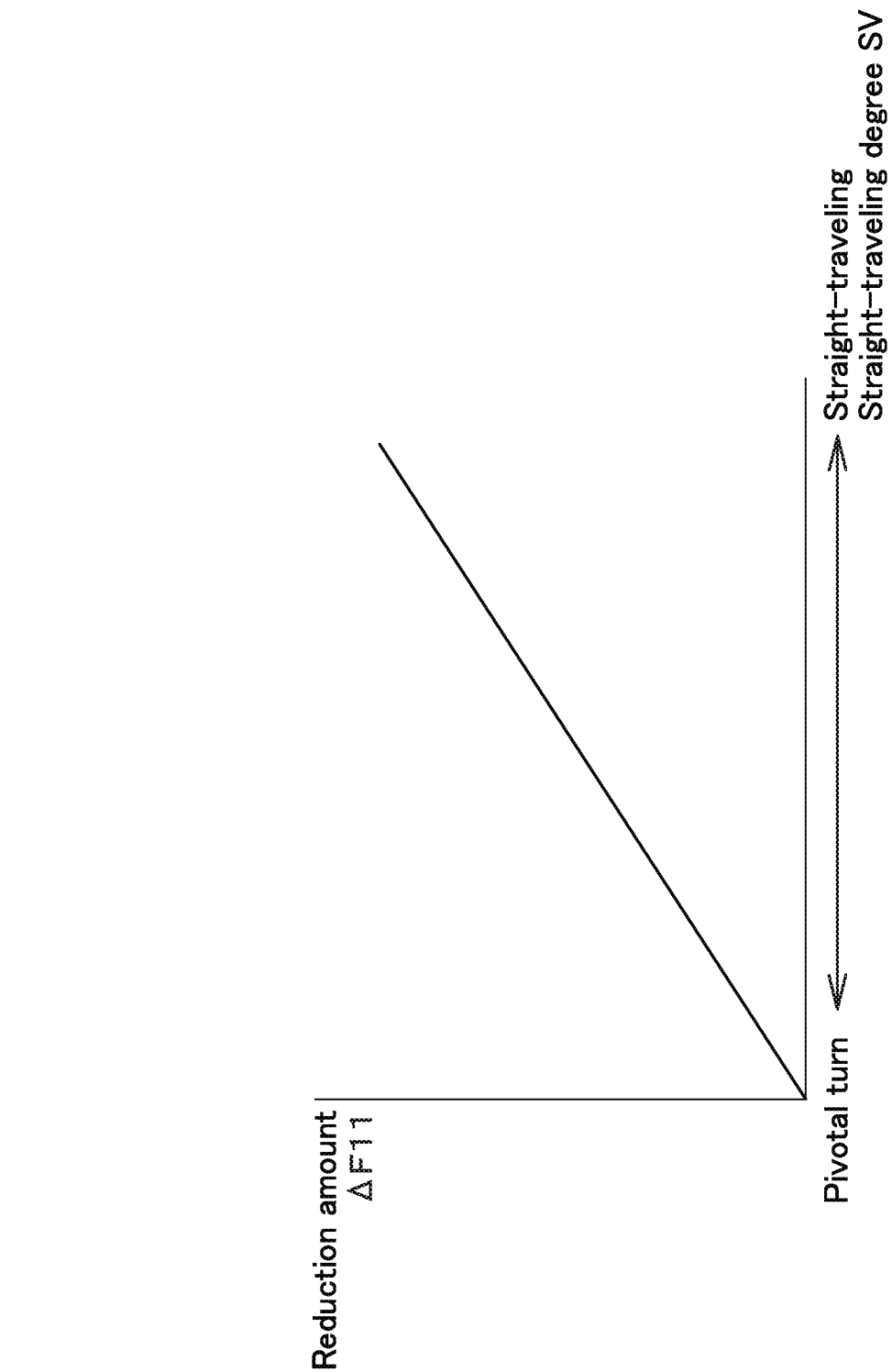
FIG. 6 is a view showing a relationship between a straight-traveling degree SV and a reduction amount ΔF11.

As shown in FIG. 6, when performing the shock-mitigation control, the controller 60 sets the reduction amount ΔF11 of the control signal in the shock-mitigation control based on the straight-traveling degree SV. For example, the controller 60 increases the reduction amount ΔF11 as the straight-traveling degree SV increases, and decreases the reduction amount ΔF11 as the straight-traveling degree SV decreases. In other words, the controller 60 increases the reduction amount ΔF11 when the straight-traveling degree SV is large such that the working vehicle 1 travels substantially straight, and the controller 60 decreases the reduction amount ΔF11 when the straight-traveling degree SV is small such that the working machine 1 travels in substantially pivotal turn.

Figure 7:
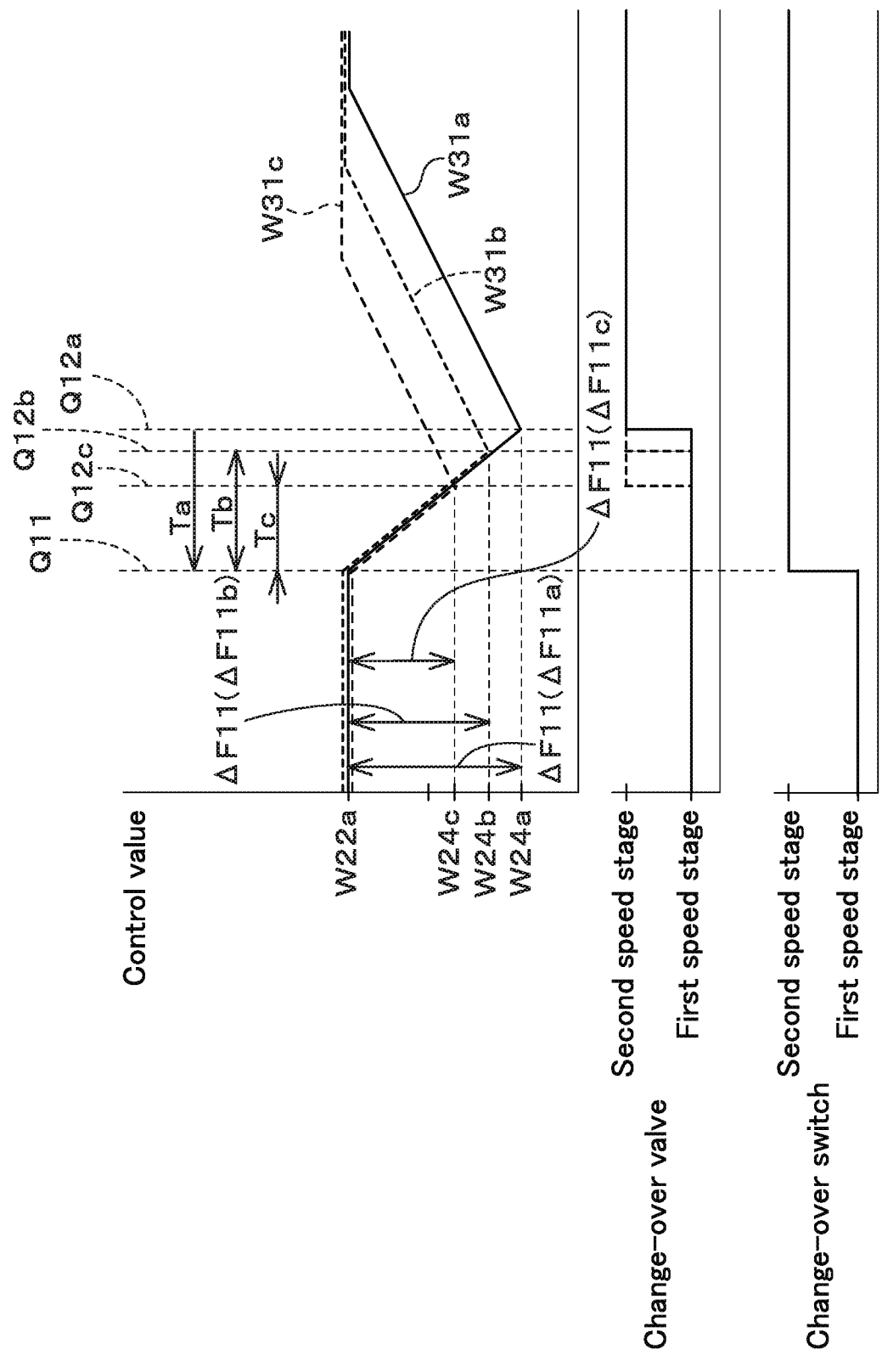
FIG. 7 is a view showing a relationship between a rotation speed of a prime mover and switching of a traveling motor according to a case where the traveling motor is decelerated.

FIG. 7 is a view showing a relationship between the control values of the control signals, i.e., mitigation values W24a, W24b and W24c, and the speed-switching of the traveling motors under the shock-mitigation control in acceleration.

It is supposed that, at a time point Q11, the change-over switch (change-over SW) 61 is operated and the controller 60 obtains an acceleration instruction (second speed instruction) to switch the speed stage from the first state (first speed) to the second state (second speed). When the controller 60 obtains the second speed instruction, the controller 60 calculates the straight-traveling degree SV and sets the reduction amount ΔF11 based on the calculated straight-traveling degree SV.

As shown in FIG. 7, for example, the controller 60 sets the reduction amount ΔF11a when, at the time point Q11, the straight-traveling degree SV is so large as to represent the traveling mode of the working machine 1 as approximately straight traveling. Alternatively, the controller 60 sets the reduction amount ΔF11b when, at the time point Q11, the straight-traveling degree SV is smaller than that corresponding to the straight traveling and the traveling status is slightly closer to a pivotal turn. Alternatively, the controller 60 sets the reduction amount ΔF11c when, at time point Q11, the straight-traveling degree SV is very small, and the traveling status is close to a pivotal turn.

Thus, the controller 60 sets the reduction amount ΔF11 (ΔF11a, ΔF11b, or ΔF11c) according to the straight-traveling degree SV at the time point Q11.

After setting the reduction amount ΔF11, the controller 60 sets, as the mitigation value W24a, W24b or W24c in the shock-mitigation control, the values obtained by subtracting the reduction amount ΔF11 (ΔF11a, ΔF11b or ΔF11c) from the control value (current control value) W22a of the control signal immediately before the reduction. For example, the controller 60 sets a value W24a, which is the value obtained by subtracting a reduction amount ΔF11a from the current control value W22, as the mitigation value. Alternatively, the controller 60 sets, as the mitigation value, a value W24b, which is the value obtained by subtracting a reduction amount ΔF11b from the current control value W22a. Alternatively, the controller 60 sets, as the mitigation value, a value W24c, which is the value obtained by subtracting a reduction amount ΔF11b from the current control value W22a.

After setting the mitigation value W24a, W24b or W24c, the controller 60 reduces the control value to be output to the actuation valve 69 until the control value reaches the mitigation value W24a, W24b or W24c.

Specifically, at the time point Q11, when the machine body 2 is travelling substantially straight, the controller 60 decreases the control value to the mitigation value W24a, as descending along a line W31a. When the control value reaches the mitigation value W24a at a time point Q12a as shown in a graph of the change-over valve control signal corresponding to the line W31a, the controller 60 outputs a signal to magnetize the solenoid of the traveling change-over valve 34 to switch the traveling change-over valve (switching valve) 34 from the first state (first speed) to the second state (second speed). After the time point Q12a, the control value is restored to the control value W22 before the reduction, as rising along the line W31a.

Alternatively, at the time point Q11, when the machine body 2 is travelling in a slightly approximate pivotal turn rather than traveling straight, the controller 60 reduces the control value to the mitigation value W24b, as descending along a line W31b. When the control value reaches the mitigation value W24b at a time point Q12b, as shown in a graph of the change-over valve control signal corresponding to the line W31b, the controller 60 outputs a signal to magnetize the solenoid of the traveling change-over valve 34 to switch the traveling change-over valve (switching valve) 34 from the first state (first speed) to the second state (second speed). In addition, after the time point Q12b, the control value is restored to the control value W22 before the reduction, as rising along the line W31b.

Alternatively, at the time point Q11, when the machine body 2 is travelling in further approximate pivotal turn, the controller 60 reduces the control value to the mitigation value W24c, as descending along the line W31c. When the control value reaches the mitigation value W24c at a time point Q12c, as shown in a graph of the change-over valve control signal corresponding to the line W31c, the controller 60 outputs a signal to magnetize the solenoid of the traveling change-over valve 34 to switch the traveling change-over valve (switching valve) 34 from the first state (first speed) to the second state (second speed). In addition, after the time point Q12c, the control value is restored to the control value W22 before the reduction, as rising along the line W31b.

Now, focusing on each of mitigation periods Ta, Tb and Tc from the time point Q11, at which the control value of the control signal starts to be reduced, to each of the time points Q12a, Q12b and Q12c, at which the reduction of the control value of the control signal stops, i.e., the mitigation period Ta, Tb or Tc for which the control value of the control signal is reduced until reaching the corresponding mitigation value W24a, W24b or W24c, the controller 60 keeps the first reduction rate of the control value constant. That is, for each of the mitigation periods Ta, Tb and Tc, the controller 60 keeps the slope of each of the lines W31a, W31b and W31c constant.

The traveling change-over valve 34 is switched between the first state and the second state at each of the time points Q12a, Q12b and Q12c. Therefore, the controller 60 is configured to change a timing for switching the traveling change-over valve 34 from the first state to the second state in corresponding to the straight-traveling degree SV.

In the second embodiment described above, for each of the mitigation periods Ta, Tb, and Tc, the control value (opening degree) of the control signal is reduced at a reduction rate kept constant for the corresponding mitigation period Ta, Tb or Tc from the start to the end. Alternatively, at an intermediate point of the mitigation period, the reduction rate may be changed.

Figure 8:
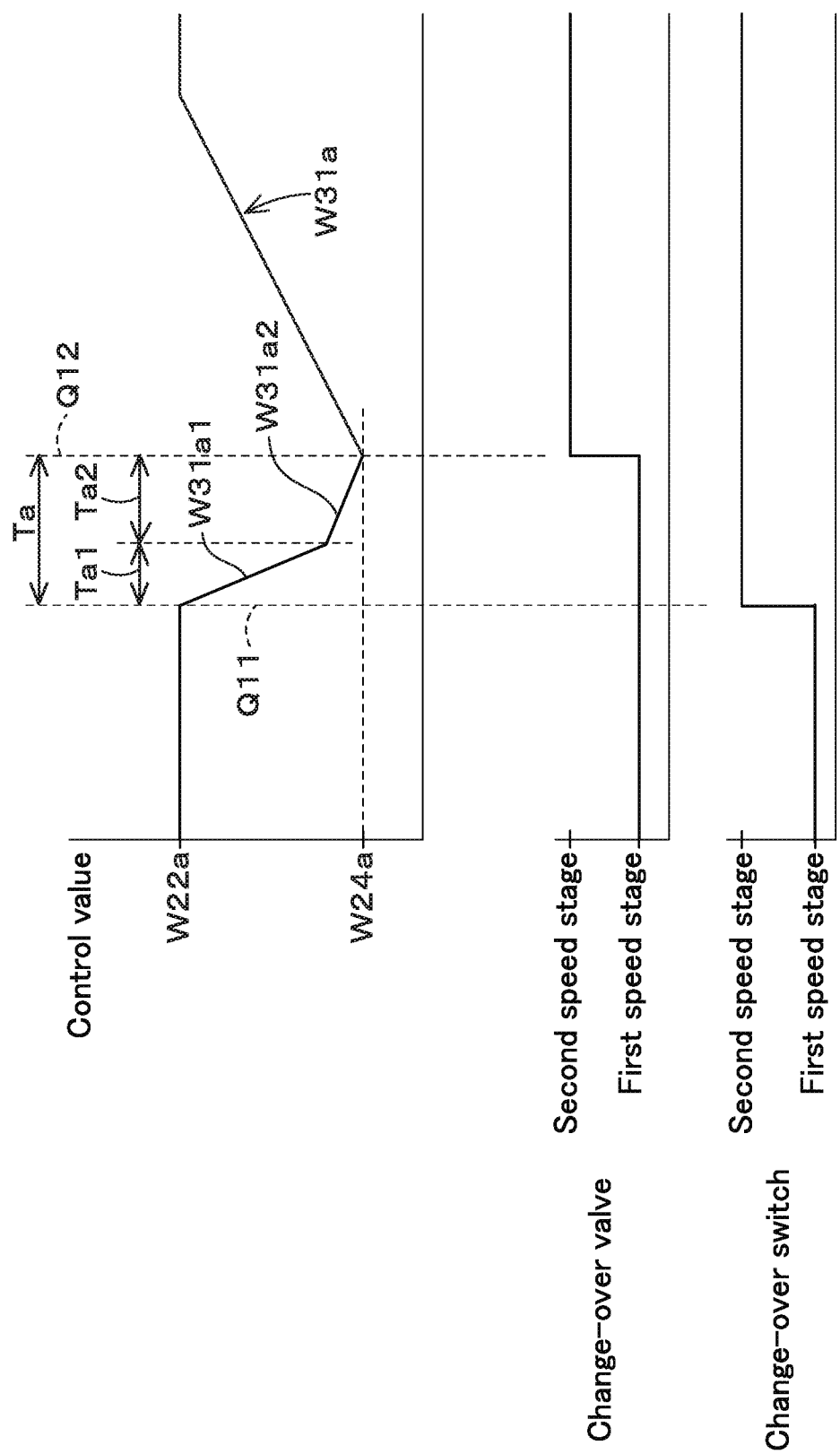
FIG. 8 is a view showing a relationship between the rotation speed of the prime mover and switching of the traveling motor according to the case where the traveling motor is decelerated.

FIG. 8 shows a modified example in which the reduction rate of the control value of the control signal is changed at the intermediate point in the mitigation period Ta.

When the controller 60 obtains the first speed instruction and calculates the mitigation value W24a based on the straight-traveling degree SV, as shown in FIG. 8, the controller 60 sets the reduction rate of the control value, in the section (first section) Ta1 defined as a first part of the mitigation period Ta from the start to the intermediate point of the mitigation period Ta to a second reduction rate, and sets the reduction rate of the control value, in the section (section section) Ta2 defined as a second part of the mitigation period Ta from the intermediate point to the end, to a third reduction rate. That is, while the line W31a indicates variation of the control value for the mitigation period Ta, the controller 60 sets the second reduction rate in the first section Ta1 based on a slope of a line W31a1 in the line W31a, and sets the third reduction rate for the second section Ta2 in the mitigation period Ta based on a slope of a line W31a2 in the line W31a. The controller 60 sets the second reduction rate (slope of line W31a1) as a value greater than the third reduction rate (slope of line W31a2).

In the above-mentioned modified example, the second and third reduction rates setting based on the line W31a is described. However, other lines W31b and 11c may set the second and third reduction rates in the same way as the setting with the line W31a. In this case, the mitigation value W24a should be read as the mitigation value W24b or W24c, the mitigation period Ta should be read as the mitigation period Tb or Tc, the line W31a should be read as the line W31b or W31c, the line W31a1 should be read as a line W31b1 or W31c1, the line W31a2 should be read as a line W31b2 or W31c2, the first section Ta1 should be read as a first section Tb1 or Tc1, and the second section Ta2 should be read as a second section Tb2 or Tc2.

Figure 9:
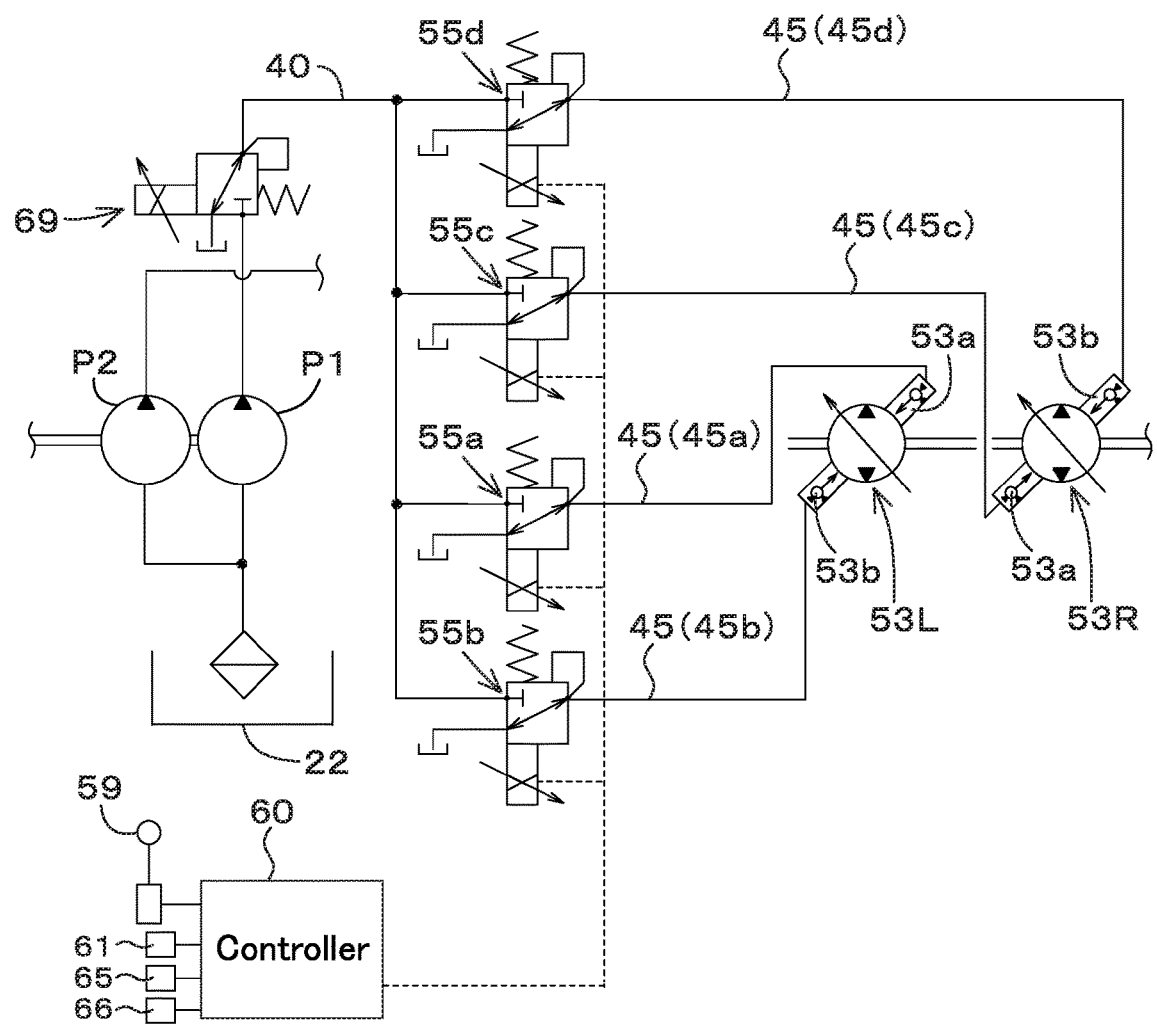
FIG. 9 is a view showing a modified example where an operation device is replaced by another operation device such as a joy stick configured to electrically operate.

In the second embodiment described above, the traveling operation device 54 is hydraulically operated to change pilot pressures acting on the traveling pumps (first traveling pump 53L and second traveling pump 53R) by means of an operation valve 55, but as shown in FIG. 9, the traveling operation device 54 may be an electrically operable device.

As shown in FIG. 9, the traveling operation device 54 is provided with the operation member 59 swingable in the lateral direction (machine width direction) or in the fore-and-aft direction, and proportional solenoid valves serving as the operation valves 55 (including the operation valves 55A, 55B, 55C, and 55D). The controller 60 is connected to an operation detection sensor which detects an operation amount and operational direction of the operation member 59. The controller 60 controls the operation valves 55 (including the operation valves 55A, 55B, 55C, and 55D) based on the operation amount and operational direction detected by the operation detection sensor.

When the operation member 59 is operated to the front (the direction A1, see FIG. 5), the controller 60 outputs a control signal to the operation valves 55A and 55C to swing the swash plates of the first traveling pump 53L and the second traveling pump 53R in the direction for normally rotating the first traveling motor 36L and the second traveling motor 36R (for forward traveling).

When the operation member 59 is operated to the rear (the direction A2, see FIG. 5), the controller 60 outputs a control signal to the operation valves 55B and 55D to swing the swash plates of the first traveling pump 53L and the second traveling pump 53R in the direction for reversely rotating the first traveling motor 36L and the second traveling motor 36R (for backward traveling).

When the operation member 59 is operated to the right (the direction A3, see FIG. 5), the controller 60 outputs a control signal to the operation valve 55A and the operation valve 55D to swing the swash plate of the first traveling pump 53L in the direction for normally rotating the first traveling motor 36L and to swing the swash plate of the second traveling pump 53R in the direction for reversely rotating the second traveling motor 36R.

When the operation member 59 is operated to the left (the direction A4, see FIG. 5), the controller 60 outputs a control signal to the operation valve 55B and the operation valve 55C to swing the swash plate of the first traveling pump 53L in the direction for reversely rotating the first traveling motor 36L and to swing the swash plate of the second traveling pump 53R in the direction for normally rotating the second traveling motor 36R.

The working machine 1 includes the prime mover 32, the traveling pumps 53L and 53R driven by power of the prime mover 32 so as to deliver operation fluid, the traveling motors 36L and 36R configured to be rotated by the operation fluid delivered from the traveling pumps 53L and 53R, the traveling motors 36L and 36R having a rotation speed shiftable between a first speed and a second speed that is higher than the first speed, the machine body 2 provided thereon with the prime mover 32, the traveling pumps 53L and 53R and the traveling motors 36L and 36R, the traveling change-over valve 34 shiftable between the first state where the rotation speeds of the traveling motors 36L and 36R are set to the first speed and the second state where the rotation speeds of the traveling motors 36L and 36R are set to the second speed, the traveling operation device 54 including the operation valve 55 configured to change a pressure of operation fluid to be applied to the traveling pumps 53L and 53R according to operation of the operation member 59, the actuation valve 69 provided upstream or downstream of the operation valve 55 to be fluidly connected to the operation valve 55 so that the actuation valve 69 is operable to control a flow of operation fluid to the operation valve 55, and the controller 60 configured or programmed to perform a shock-mitigation control for reducing an opening degree of the actuation valve 69 by outputting a control signal to the actuation valve 69 when the traveling change-over valve 34 is shifted from the first state to the second state. The controller 60 is configured or programmed to determine the reduction amount of the opening degree of the actuation valve 69 reduced by the shock-mitigation control, based on a straight-traveling degree of the machine body 2.

According to this configuration, since the straight-traveling degree of the machine body 2 is determined based on the direction in which a driver (operator) operates the operation member 59 of the traveling operation device 54, the opening degree of the actuation valve 69 is reduced according to the straight-traveling degree of the machine body 2, that is, according to the operation by the driver (operator), so that the acceleration (switching from the first state to the second state) can be performed while reducing the shift shock as intended. In other words, when a pressure acting on the operation valve 55 is changed by decreasing the opening degree of the actuation value 69 in order to reduce the shift shock, it is possible to realize a balance between the pressure of hydraulic fluid output from the operation valve 55 to the traveling pumps 53L and 53R and the straight traveling degree of the machine body 2 actually traveling (operation by the driver (operator)). Accordingly, the shift shock can be reduced while suppressing the rattling of the working machine 1 due to the shock-mitigation control.

The actuation valve 69 is configured so that the opening degree thereof becomes larger as the control value corresponding to the control signal becomes larger, and the opening degree thereof becomes smaller as the control value becomes smaller, and the controller 60 is configured or programmed to determine the reduction amount ΔF11 of the control value as the reduction amount ΔF11 of the opening degree of the actuation valve 69 based on the straight-traveling degree of the machine body 2, and to calculate the mitigation value W24$a$, W24$b$ or W24$c$ for the shock-mitigation control based on the reduction amount ΔF11.

According to this configuration, the mitigation value W24$a$, W24$b$ or W24$c$ of the control value of the control signal output to the actuation valve 69 can be set according to the straight-traveling degree of the machine body 2, so that the shift shock can be reduced more smoothly.

When the period for the shock mitigation control until the control value reduced by the shock mitigation control reaches the mitigation value is defined as the mitigation period Ta, Tb or Tc, the controller 60 is configured or programmed to reduce the control value at the first reduction rate W24$a$, W24$b$ or W24$c$ kept constant for the mitigation period from the start point thereof to the end point thereof.

According to this configuration, the pressure of hydraulic fluid acting on the traveling pumps 53L and 53R can be lowered as smoothly as possible, so that the shift shock can be reduced smoothly without discomfort.

When the period for the shock mitigation control until the control value reduced by the shock mitigation control reaches the mitigation value is defined as the mitigation period Ta, Tb or Tc, the controller 60 is configured or programmed to reduce the control value at the second reduction rate for the first part of the mitigation period Ta, Tb or Tc from the start point thereof to the intermediate point thereof, and to reduce the control value at the third reduction rate for the second part of the mitigation period Ta, Tb or Tc from the intermediate point thereof to the end point thereof, the second reduction rate being greater than the third reduction rate.

According to this configuration, the responsiveness of the actuation valve 69 can be improved in shock-mitigation control.

The controller 60 is configured or programmed to change the timing for shifting the traveling change-over valve 34 from the first state to the second state in correspondence to modified example in the straight-traveling degree.

According to this configuration, the timing of acceleration can be changed suitably for the straight traveling of the machine body 2 and for the pivot turn or the like of the machine body 2, so that workability can be further improved.

The controller 60 is configured or programmed to determine the reduction amount ΔF11 based on the straight-traveling degree in such a way that the reduction amount ΔF11 becomes larger as the straight-traveling degree becomes larger, and the reduction amount ΔF11 becomes smaller as the straight-traveling degree becomes smaller.

According to this configuration, for example, when the machine body 2 is traveling straight, the shift shock in the acceleration can be further reduced in the straight traveling by increasing the reduction amount ΔF11, and when the machine body 2 is changing its traveling from the straight traveling to the pivot turn or when the machine body 2 is pivotally turning, the reduction amount ΔF11 is reduced so that the shift shock can be reduced in a stable manner while maintaining, in the pumps 53L and 53R, a pressure difference (differential pressure) between the hydraulic fluids acting on the traveling motors 36L and 36R for the normally-rotating direction or the reversely rotating direction.

The working machine 1 further includes the first traveling device 5L provided on a left portion of the machine body 2, and the second traveling device 5R provided on a right portion of the machine body 2. The traveling motor 36L serving as a first traveling motor configured to output a traveling power to the first traveling device 5L and the traveling motor 36R serving as a second traveling motor configured to output a traveling power to the second traveling device 5R are each provided as the traveling motor. The traveling pumps 53L and 53R are configured to rotate the first traveling motor and the second traveling motor. The traveling change-over valve 34 is configured to shift the rotation speed of the first and second traveling motors between the first speed and the second speed.

This makes it possible to mitigate the shift shock more smoothly in the working machine 1 having the first traveling device 5L on the left portion of the machine body 2 and the second traveling device 5R on the right portion of the machine body 2.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
a prime mover;
a traveling pump driven by power of the prime mover so as to deliver operation fluid;
a traveling motor configured to be rotated by the operation fluid delivered from the traveling pump, the traveling motor having a rotation speed shiftable between a first speed and a second speed that is higher than the first speed;
a machine body provided thereon with the prime mover, the traveling pump and the traveling motor;
a traveling change-over valve shiftable between a first state where the rotation speed of the traveling motor is set to the first speed and a second state where the rotation speed of the traveling motor is set to the second speed; and
a controller configured or programmed to perform a shock-mitigation control for reducing a rotation speed of the prime mover when the traveling change-over valve is shifted from the second state to the first state, wherein
the controller is configured or programmed to determine a reduction amount of rotation speed of the prime mover reduced by the shock mitigation control based on a drop amount defined as a difference between a target rotation speed of the prime mover and an actual rotation speed of the prime mover.

2. The working machine according to claim 1, wherein the controller is configured or programmed to calculate a mitigation value of the prime mover in the shock mitigation control by subtracting the reduction amount from the actual rotation speed of the prime mover.

3. The working machine according to claim 2, wherein when a period for the shock mitigation control until the actual rotation speed of the prime mover reduced by the shock mitigation control reaches the mitigation value is defined as a mitigation period, the controller is configured or programmed to reduce the actual rotation speed of the prime mover at a first reduction rate kept constant for the mitigation period from a start point thereof to an end point thereof.

4. The working machine according to claim 2, wherein when a period for the shock mitigation control until the actual rotation speed of the prime mover reduced by the shock mitigation control reaches the mitigation value is defined as a mitigation period, the controller is configured or programmed to reduce the actual rotation speed of the prime mover at a second reduction rate for a first part of the mitigation period from a start point thereof to an intermediate point thereof, and to reduce the actual rotation speed of the prime mover at a third reduction rate less than the second reduction rate for a second part of the mitigation period from the intermediate point thereof to an end point thereof.

5. The working machine according to claim 2, wherein the controller is configured or programmed to change a timing for shifting the traveling change-over valve from the second state to the first state in correspondence to the drop amount.

6. The working machine according to claim 2, further comprising:
a change-over switch operable to issue a speed-shift instruction selected between an acceleration instruction to shift the rotation speed of the traveling motor from the first speed to the second speed and a deceleration instruction to shift the rotation speed of the traveling motor from the second speed to the first speed; and
an accelerator operable to set a target rotation speed of the prime mover, wherein when the change-over switch is operated to issue the speed-shift instruction, the controller is configured or programed to reduce the actual rotation speed of the prime mover to the mitigation value determined based on the reduction amount, and to shift the traveling change-over valve to either the first state or the second state in correspondence to the speed-shift instruction.

7. The working machine according to claim 2, wherein the controller is configured or programmed to determine the reduction amount based on the drop amount in such a way that the reduction amount becomes larger as the drop amount becomes smaller, and the reduction amount becomes smaller as the drop amount becomes larger.

8. The working machine according to claim 1, wherein the controller is configured or programmed to change a timing for shifting the traveling change-over valve from the second state to the first state in correspondence to the drop amount.

9. The working machine according to claim 1, further comprising:
a change-over switch operable to issue a speed-shift instruction selected between an acceleration instruction to shift the rotation speed of the traveling motor from the first speed to the second speed and a deceleration instruction to shift the rotation speed of the traveling motor from the second speed to the first speed; and
an accelerator operable to set a target rotation speed of the prime mover, wherein when the change-over switch is operated to issue the speed-shift instruction, the controller is configured or programmed to reduce the actual rotation speed of the prime mover to the mitigation value determined based on the reduction amount, and to shift the traveling change-over valve to either the first state or the second state in correspondence to the speed-shift instruction.

10. The working machine according to claim 1, wherein the controller is configured or programmed to determine the reduction amount based on the drop amount in such a way that the reduction amount becomes larger as the drop amount becomes smaller, and the reduction amount becomes smaller as the drop amount becomes larger.

11. The working machine according to claim 1, further comprising:
a first traveling device provided on a left portion of the machine body; and
a second traveling device provided on a right portion of the machine body, wherein a first traveling motor configured to output a traveling power to the first traveling device and a second traveling motor configured to output a traveling power to the second traveling device are each provided as the traveling motor,
the traveling pump is configured to rotate the first traveling motor and the second traveling motor, and
the traveling change-over valve is configured to shift the rotation speed of the first and second traveling motors between the first speed and the second speed.

\* \* \* \* \*